US012655794B2

(12) United States Patent
Naik et al.

(10) Patent No.: US 12,655,794 B2
(45) Date of Patent: Jun. 16, 2026

(54) GAS TURBINE WITH DIFFUSER STEAM INJECTION INTO A COMBUSTOR

(71) Applicant: General Electric Company, Schenectady, NY (US)

(72) Inventors: Pradeep Naik, Bengaluru (IN); Sibtosh Pal, Mason, OH (US); Saket Singh, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 225 days.

(21) Appl. No.: 18/497,199

(22) Filed: Oct. 30, 2023

(65) Prior Publication Data

US 2024/0401527 A1 Dec. 5, 2024

(30) Foreign Application Priority Data

Jun. 2, 2023 (IN) .............................. 202311038029

(51) Int. Cl.
*F02C 7/04* (2006.01)
(52) U.S. Cl.
CPC ..................................... *F02C 7/04* (2013.01)
(58) Field of Classification Search
CPC .... F02C 3/34; F02C 3/305; F02C 3/30; F02C 7/125
See application file for complete search history.

(56) References Cited

U.S. PATENT DOCUMENTS

| | | | |
|---|---|---|---|
| 4,356,693 A * | 11/1982 | Jeffery ...................... | F23R 3/46 |
| | | | 60/751 |
| 4,918,926 A | 4/1990 | Nikkanen | |
| 4,955,191 A | 9/1990 | Okamoto et al. | |
| 5,592,821 A | 1/1997 | Alary et al. | |
| 5,697,209 A | 12/1997 | Wettstein | |
| 6,983,605 B1 | 1/2006 | Hook et al. | |
| 7,574,864 B2 | 8/2009 | Tiemann | |
| 8,572,982 B2 | 11/2013 | Tiemann | |
| 8,656,699 B2 | 2/2014 | Saito et al. | |
| 10,088,160 B2 | 10/2018 | Koganezawa | |
| 2011/0185699 A1 | 8/2011 | Danis et al. | |
| 2014/0325990 A1 | 11/2014 | Takeda et al. | |
| 2017/0038075 A1 | 2/2017 | Duchaine et al. | |
| 2024/0309810 A1* | 9/2024 | Kramer ...................... | F02C 3/30 |

FOREIGN PATENT DOCUMENTS

CN 114263933 B 7/2022

* cited by examiner

*Primary Examiner* — Rodolphe Andre Chabreyrie
(74) *Attorney, Agent, or Firm* — Venable LLP; Edward A. Kmett; Michele V. Frank

(57) ABSTRACT

A gas turbine includes a combustion section, and a diffuser arranged to provide a flow of compressed air from a compressor to the combustion section. The diffuser includes a steam injection system that provides a flow of steam from the diffuser to the combustion section.

20 Claims, 16 Drawing Sheets

GAS TURBINE WITH DIFFUSER STEAM INJECTION INTO A COMBUSTOR

CROSS REFERENCE TO RELATED APPLICATIONS

The present application claims the benefit of Indian patent application Ser. No. 202311038029, filed on Jun. 2, 2023, which is hereby incorporated by reference herein in its entirety.

TECHNICAL FIELD

The present disclosure relates to a gas turbine engine with diffuser injection of steam into a combustor.

BACKGROUND

A combustor may generally include a swirler that provides a flow of swirled air mixed with fuel into a combustion chamber, where the fuel and air mixture is ignited and burned. The burning of the fuel and air mixture in the combustion chamber results in carbon monoxide (CO) and nitrous oxide (NO$_x$) emissions from the combustor. One technique to attempt to reduce the CO and the NO$_x$ emissions is to inject steam or water directly into the swirler via, for example, a fuel nozzle, to mix with the fuel and air mixture.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A combustor may generally include a swirler that provides a flow of swirled air mixed with fuel into a combustion chamber, where the fuel and air mixture is ignited and burned. The burning of the fuel and air mixture in the combustion chamber results in carbon monoxide (CO) and nitrous oxide (NO$_x$) emissions from the combustor. One technique to attempt to reduce the NO$_x$ emissions is to inject steam or water directly into the swirler via, for example, a fuel nozzle, to mix with the fuel and air mixture. However, the direct injection of steam or water into the swirler may reduce the burn efficiency of the fuel and air mixture, thereby, increasing the CO emissions, as well as causing a flameout within the combustor. In addition, injecting steam into the combustor can improve specific fuel consumption (SFC) for the engine.

The present disclosure aims to address the foregoing by injecting steam into a combustion section via a diffuser. The injection of the steam by the diffuser into a plenum upstream of the swirler allows the steam to mix with the air from the compressor in the plenum prior to the air being provided to the swirler, thereby reducing the amount of steam that is provided directly into the fuel/air mixture in the swirler. At the same time, the steam mixed with the compressed air in the plenum can be provided into the combustion chamber via dilution openings in combustor liners. As a result, the steam contained within the dilution air can help to reduce the CO and NO$_x$ emissions, while also reducing the possibility of a flameout condition occurring.

Figure 1:
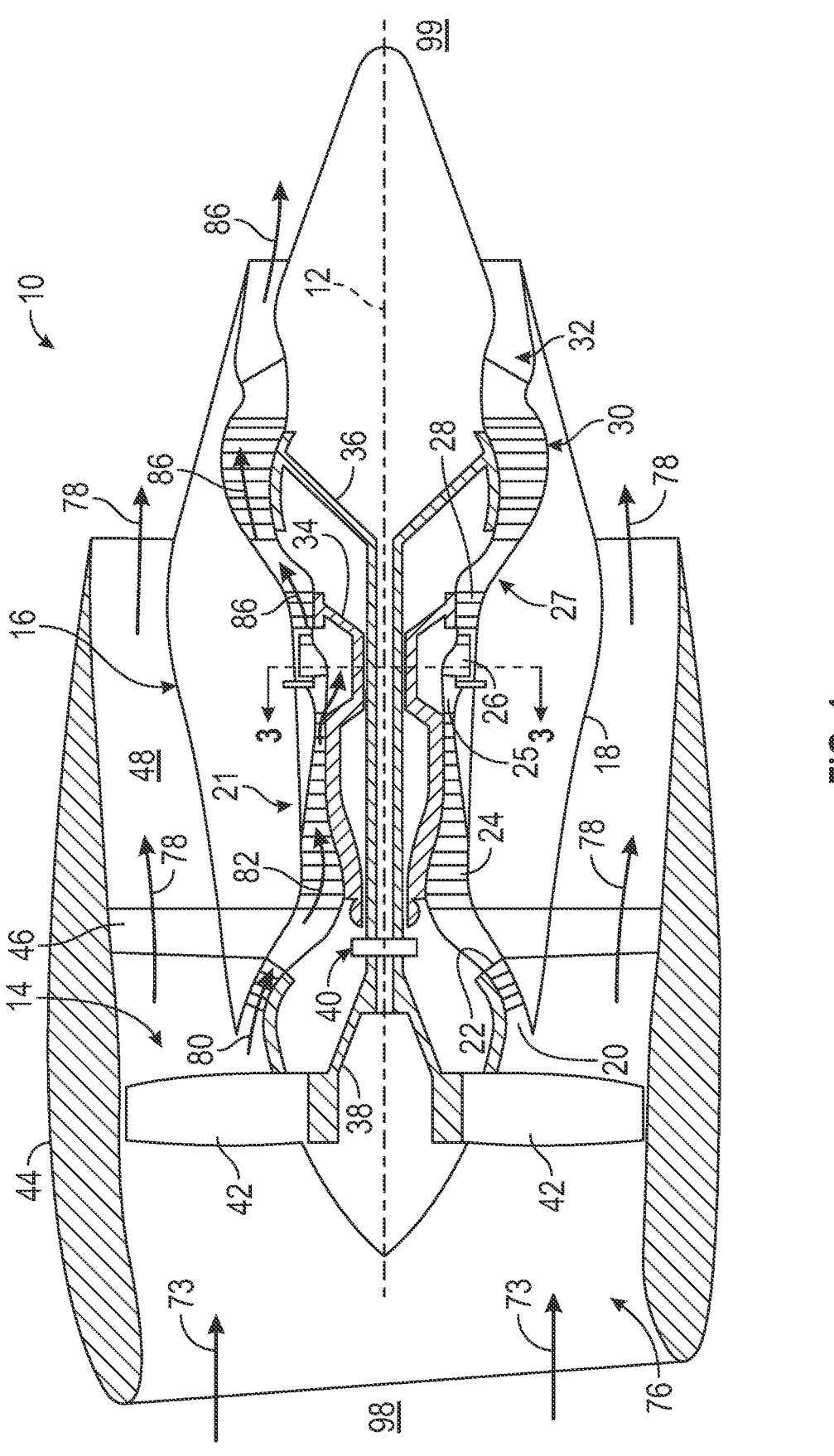
FIG. 1 is a schematic partial cross-sectional side view of an exemplary high by-pass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. As shown in FIG. 1, the engine 10 has a longitudinal centerline axis 12 that extends therethrough from an upstream end 98 to a downstream end 99 for reference purposes. In general, the engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, a compressor section 21 having a low pressure (LP) compressor 22 and a high pressure (HP) compressor 24, a diffuser 25, a combustion section 26, a turbine section 27 including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
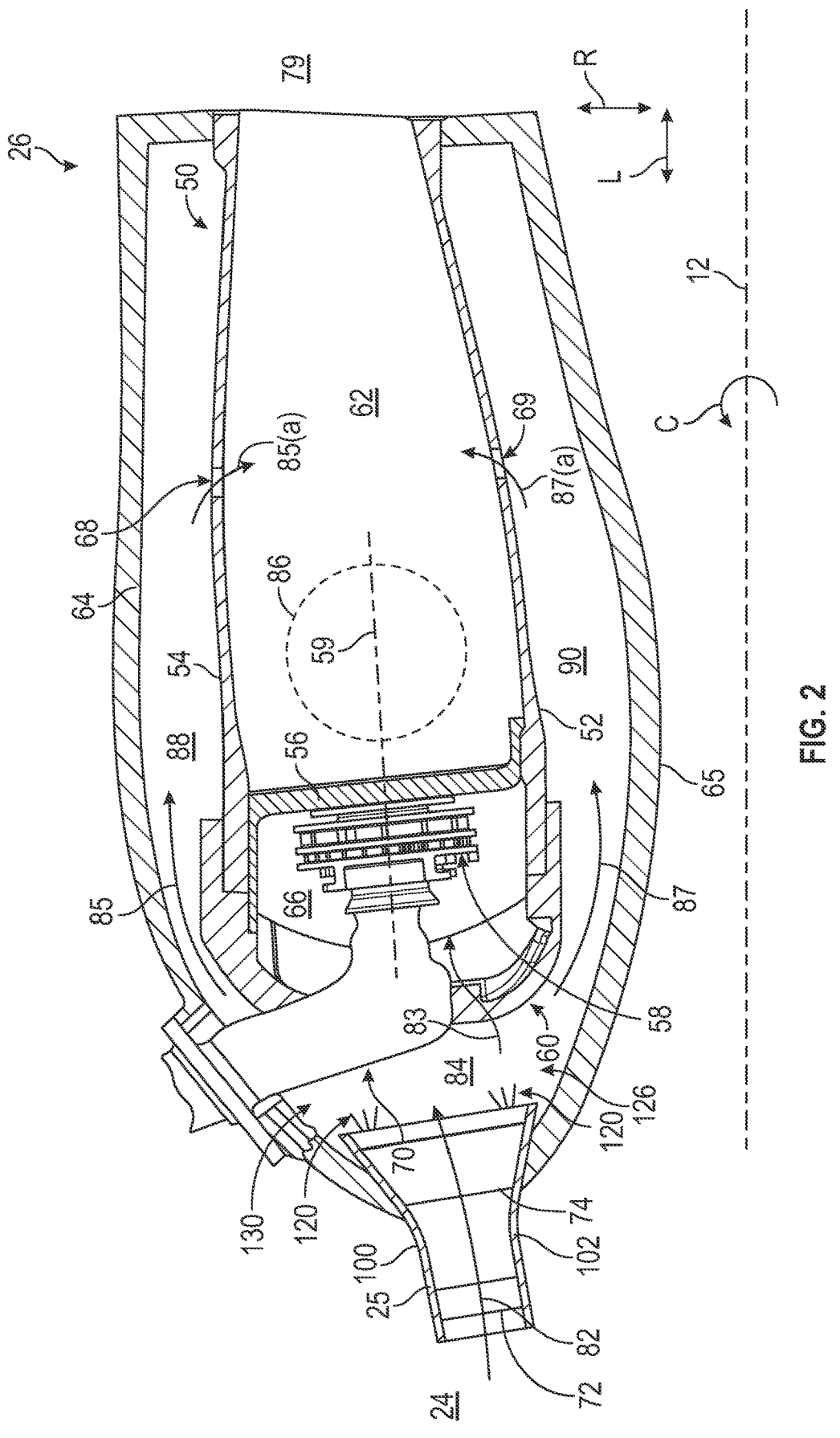
FIG. 2 is a partial cross-sectional side view of an exemplary combustor, according to an aspect of the present disclosure.

FIG. 2 is a partial cross-sectional side view of an exemplary combustion section 26 of the core engine 16 as shown in FIG. 1, according to an aspect of the present disclosure. The exemplary combustion section 26 shown in FIG. 2 is depicted as an annular type combustion section that extends circumferentially about the longitudinal centerline axis 12. The annular combustion section 26 includes an annular combustor outer casing 64, an annular combustor inner casing 65, and a combustor 50 arranged between the annular combustor outer casing 64 and the annular combustor inner casing 65. As shown in FIG. 2, the combustor 50 includes an annular inner liner 52, an annular outer liner 54, and an annular dome 56, each of which extends circumferentially about the longitudinal centerline axis 12. The annular outer liner 54 may include a plurality of dilution openings 68 (one shown in FIG. 2) therethrough, and the annular inner liner 52 may include a plurality of dilution openings 69 (one shown in FIG. 2) therethrough. The annular inner liner 52 and the annular outer liner 54 are connected to the annular dome 56 thereby defining an annular combustion chamber 62 therebetween. The annular inner liner 52 and the annular outer liner 54 may extend from the annular dome 56 to a turbine nozzle 79 at an entry to the HP turbine 28 (FIG. 1), thus, at least partially defining a hot gas path between the annular dome 56 and the HP turbine 28. In addition, a cowl 60 is connected to the annular inner liner 52, the annular outer liner 54, and the annular dome 56, thereby defining a pressure plenum 66 therewithin. The combustor 50 further includes a plurality of swirler assemblies 58 (one shown in FIG. 2) that are connected to the annular dome 56, and a plurality of fuel nozzle assemblies 70 (one shown in FIG. 2) that are connected with the annular combustor outer casing 64, extend through the cowl 60, and are connected with the respective swirler assemblies 58. A centerline axis 59 of the swirler assembly 58 may be defined extending through the swirler assembly 58.

As shown in FIG. 2, the annular combustor outer casing 64 and the annular combustor inner casing 65 surround the combustor 50, and define a plenum 84 therebetween. The plenum 84 may include an outer flow passage 88 surrounding the annular outer liner 54, and an inner flow passage 90 surrounding the annular inner liner 52. The diffuser 25 is connected to the combustion section 26 and provides a flow of compressed air 82 from the HP compressor 24 into the plenum 84. As shown in FIG. 2, the diffuser 25 may be connected to an upstream end of the annular combustor outer casing 64 and to an upstream end of the annular combustor inner casing 65. The diffuser 25, which will be described in more detail below, extends circumferentially about the longitudinal centerline axis 12, and may include a plurality of outlet guide vanes 72 (one shown in FIG. 2) and a plurality of diffuser struts 74 (one shown in FIG. 2). Each of the plurality of outlet guide vanes 72 and the diffuser struts 74 may be circumferentially spaced apart about the longitudinal centerline axis 12. In addition, as will be described in more detail below, the diffuser 25 includes a steam injection system (not shown in FIG. 2) that may be implemented to inject steam 120 from the diffuser 25 into the plenum 84.

Referring collectively to FIGS. 1 and 2, during operation of the engine 10, a volume of air 73, as indicated schematically by arrows, enters the engine 10 from the upstream end 98 through an associated nacelle inlet 76 of the nacelle 44 and/or the fan assembly 14. As the air 73 passes across the fan blades 42, a portion of the air 73 is directed or routed into the bypass airflow passage 48 as a bypass airflow 78, while another portion of the air 73 is directed or routed into the LP compressor 22 via the annular inlet 20 as a compressor inlet air 80. The compressor inlet air 80 is progressively compressed to form the compressed air 82 as it flows from the annular inlet 20 through the LP compressor 22 and the HP compressor 24 towards the combustion section 26. As shown in FIG. 2, the compressed air 82 flows through the diffuser 25 and into the plenum 84 of the combustion section 26 to pressurize the plenum 84. A first portion of the compressed air 82 in the plenum 84, as indicated schematically by an arrow denoting compressed air 83, flows from the plenum 84 into the pressure plenum 66 of the cowl 60, where it is mixed by swirler assemblies 58 with fuel provided by the fuel nozzle assemblies 70. An air/fuel mixture is then ejected into the annular combustion chamber 62 by the swirler assemblies 58, and the air/fuel mixture is ignited and burned to generate combustion gases 86 within the annular combustion chamber 62. A second portion of the compressed air 82 in the plenum 84, as indicated schematically by arrows denoting compressed air 85 and compressed air 87, may be routed into the outer flow passage 88, and into the inner flow passage 90, respectively. A portion of the compressed air 85 flowing through the outer flow passage 88, shown schematically as compressed air 85(*a*), may be routed through the plurality of dilution openings 68 of the annular outer liner 54 into the annular combustion chamber 62 to provide quenching of the combustion gases 86. Similarly, a portion of the compressed air 87 flowing through the inner flow passage 90, shown schematically as compressed air 87(*a*), may be routed through the plurality of dilution openings 69 of the annular inner liner 52 into the annular combustion chamber 62 to provide quenching of the combustion gases 86.

Referring still to FIGS. 1 and 2 collectively, the combustion gases 86 generated in the annular combustion chamber 62 flow into the HP turbine 28 via the turbine nozzle 79, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at the downstream end 99.

Figure 3:
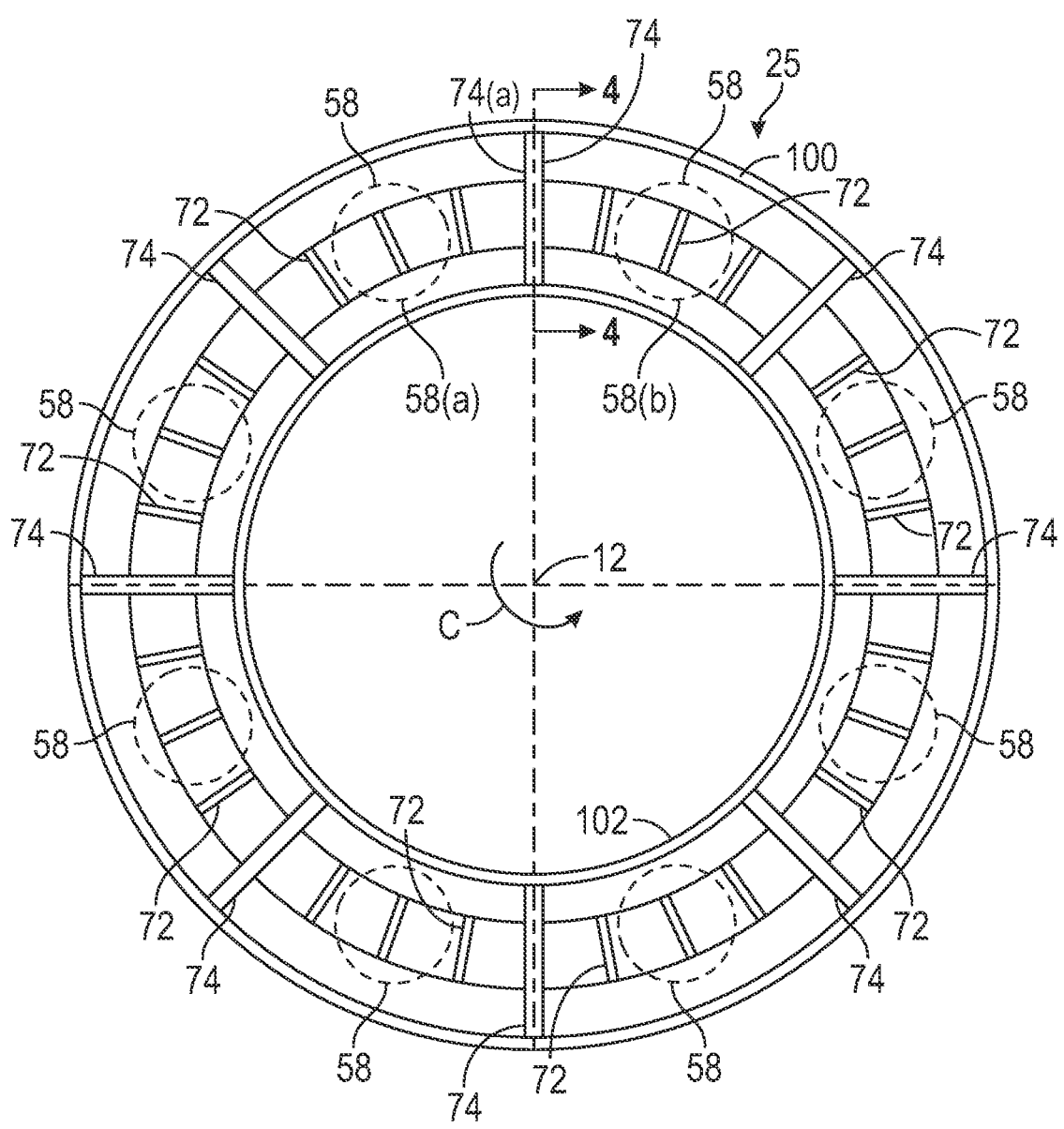
FIG. 3 is a forward-looking view of a diffuser, taken at plane 3-3 of FIG. 1, according to an aspect of the present disclosure.

FIG. 3 is a forward-looking view of a diffuser, taken at plane 3-3 of FIG. 1, according to an aspect of the present disclosure. Referring to FIGS. 2 and 3 collectively, the diffuser 25 includes a diffuser outer casing 100 and a diffuser inner casing 102. Both the diffuser outer casing 100 and the diffuser inner casing 102 extend circumferentially about the longitudinal centerline axis 12. As was described above, the diffuser 25 includes a plurality of diffuser struts 74, which connect the diffuser outer casing 100 and the diffuser inner casing 102 to each other. As shown in FIG. 3, the plurality of diffuser struts 74 are circumferentially spaced apart from one another about the longitudinal centerline axis 12. In addition, as shown in FIG. 3, the plurality of outlet guide vanes 72 are circumferentially spaced apart about the longitudinal centerline axis 12. The number of outlet guide vanes 72 that are included in the diffuser 25 may be more than the number of diffuser struts 74. For example, FIG. 3 depicts eight diffuser struts 74 circumferentially spaced apart about the diffuser 25, and thirty-two outlet guide vanes 72 circumferentially spaced apart about the diffuser 25 (eight of the outlet guide vanes 72 being hidden behind respective ones of the diffuser struts 74 in FIG. 3). In FIG. 3, for reference purposes, circumferential positions of the plurality of swirler assemblies 58 are depicted with dashed lines with respect to circumferential positions of the plurality of diffuser struts 74. As shown in FIG. 2, the swirler assemblies 58 are located axially downstream in a longitudinal direction L from the diffuser 25, and, therefore, the dashed representation in FIG. 3 merely depicts the circumferential arrangement of the swirler assemblies 58 with respect to the diffuser struts 74. As shown in FIG. 3, at least one of the plurality of diffuser struts 74 (e.g., diffuser strut 74(*a*)) is arranged circumferentially between a pair of the swirler assemblies 58 (e.g., between a pair of the swirler assemblies 58 consisting of a first swirler assembly 58(*a*) and a second swirler assembly 58(*b*)). The present disclosure is not limited to the diffuser struts 74 being circumferentially arranged between a pair of the swirler assemblies 58, and other arrangements may be included. For example, the diffuser struts 74 may be circumferentially aligned with the swirler assemblies 58. In addition, while one diffuser strut 74(*a*) is shown being arranged between the pair of swirler assemblies 58(*a*) and 58(*b*), more than one diffuser strut 74 may be arranged between the pair of swirler assemblies 58(*a*) and 58(*b*).

Figure 4:
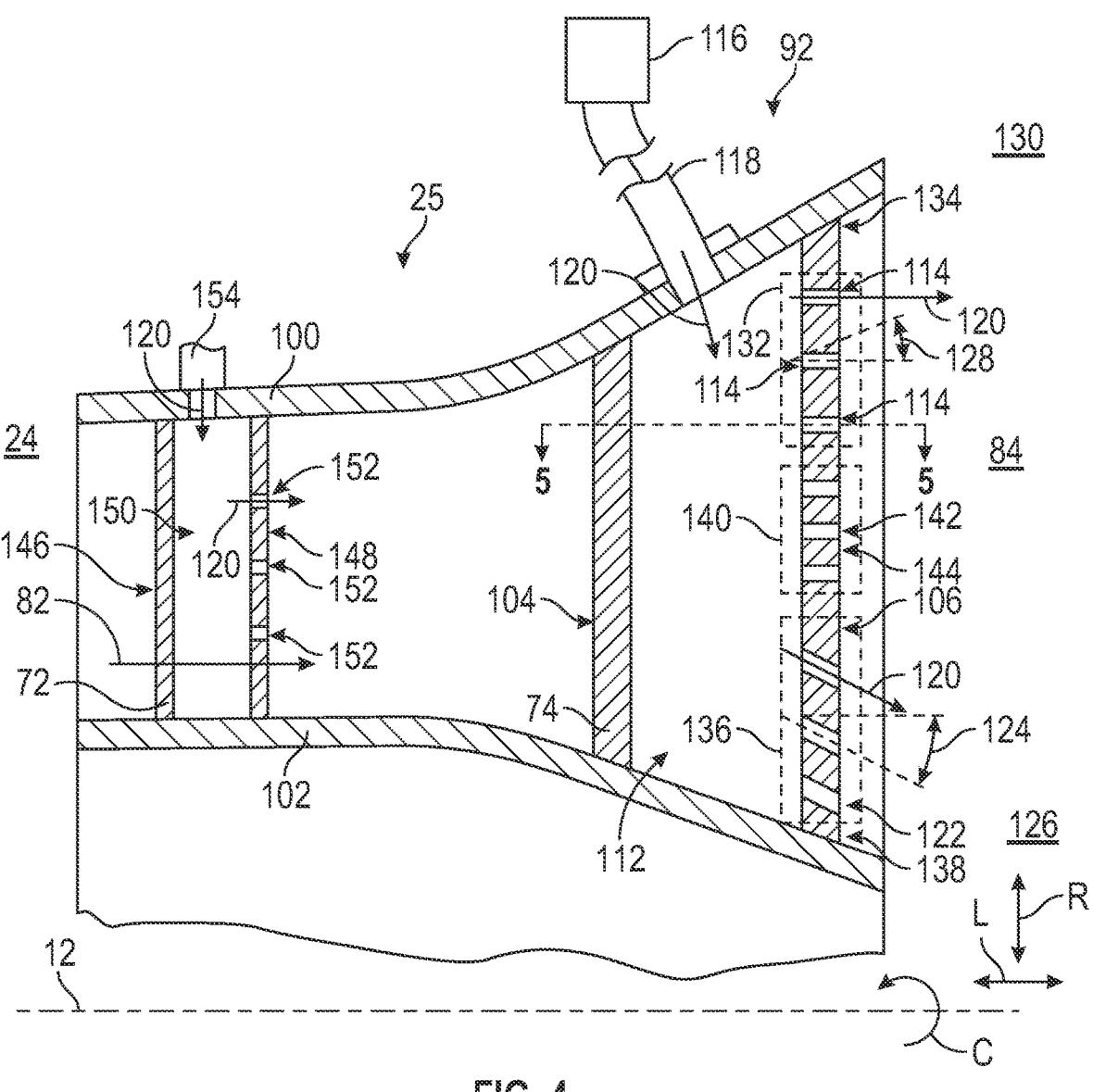
FIG. 4 is a partial cross-sectional view of the diffuser, taken at plane 4-4 of FIG. 3, according to an aspect of the present disclosure.
Figure 5:
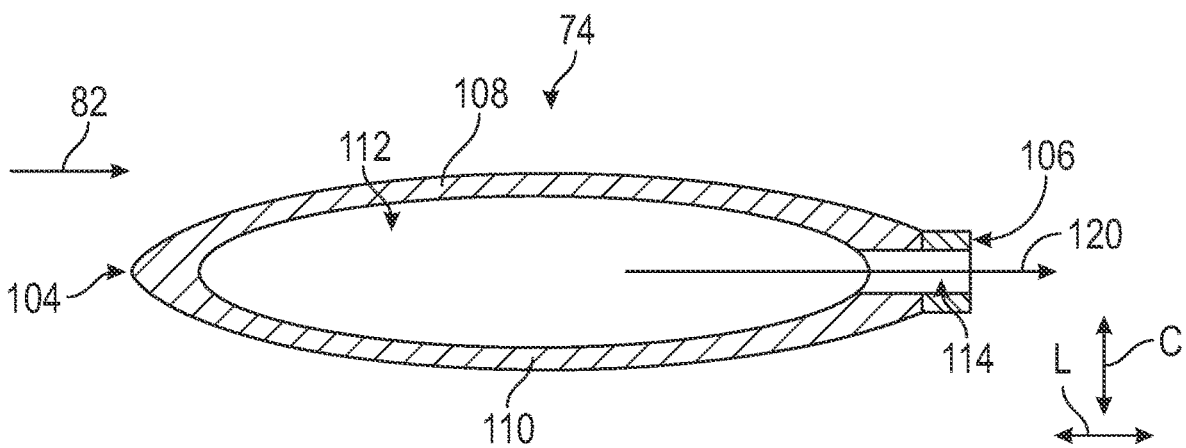
FIG. 5 is a cross-sectional view of a diffuser strut, taken at plane 5-5 of FIG. 4, according to an aspect of the present disclosure.

FIG. 4 is a partial cross-sectional view of the diffuser 25, taken at plane 4-4 of FIG. 3, according to an aspect of the present disclosure. FIG. 5 is a cross-sectional view of the diffuser strut 74, taken at plane 5-5 of FIG. 4. Referring collectively to FIGS. 4 and 5, and as will be described in more detail below, the diffuser 25 includes a steam injection system 92 for injecting the steam 120 into the combustion section 26 (FIGS. 1 and 2). The diffuser 25 includes the diffuser outer casing 100 and the diffuser inner casing 102 that are connected to each other via the diffuser strut 74. As shown in FIG. 5, the diffuser strut 74 has an airfoil shaped cross-sectional profile that includes a leading edge 104, a trailing edge 106, a first side wall 108, and a second side wall 110. The diffuser strut 74 defines a part of the steam injection system 92 and includes a steam channel 112, which may be a hollow core of the diffuser strut 74. Steam 120 can be provided to the steam channel 112 from a steam source 116. A steam passage 118 may be connected to the diffuser 25 to provide the steam 120 from the steam source 116 to the steam channel 112. Both the steam source 116 and the steam passage 118 also define a part of the steam injection system 92.

The diffuser strut 74 also includes a plurality of outlets 114 through the trailing edge 106 of the diffuser strut 74. The steam 120 can then be injected from the steam channel 112 through the plurality of outlets 114 into the plenum 84, along with the compressed air 82 flowing through the diffuser 25. In FIG. 4, the plurality of outlets 114 are shown as being generally parallel to the longitudinal centerline axis 12. However, a plurality of angled outlets 122 may be provided through the trailing edge 106 instead. For example, the angled outlets 122 may be arranged at an angle 124 so as to direct the steam 120 toward an inner side 126 of the plenum 84 (see also FIG. 2). Similarly, the outlets 114 may be arranged at an angle 128 to direct the steam toward an outer side 130 of the plenum (see also FIG. 2). In addition, various combinations of outlets may be included through the trailing edge 106. For example, an outer group 132 of the outlets 114 may be included through an outer side 134 of the trailing edge 106. Here, "outer" may be in reference to a radial direction R extending from the longitudinal centerline axis 12. Similarly, an inner group 136 may be provided through an inner side 138 of the trailing edge 106. Further, a middle group 140 of middle outlets 142 may be included through a middle portion 144 of the trailing edge 106. Any combination of the outer group 132, the inner group 136, or the middle group 140 can be included in any one or more of the plurality of diffuser struts 74, and the present disclosure is not limited to any one particular combination. With the foregoing arrangement, the steam 120 delivered to the steam channel 112 can then be injected from the diffuser strut 74 into the plenum 84, thereby providing a steam/compressed air mixture in the plenum 84 that flows through the swirler assemblies 58 (FIGS. 2 and 3) into the annular combustion chamber 62 (FIG. 2), and through the outer dilution openings 68 and the inner dilution openings 69 (FIG. 2) into the annular combustion chamber 62.

Referring to FIG. 4, the outlet guide vane 72 may also define a part of the steam injection system 92, and the outlet guide vane 72 is seen to include a leading edge 146 and a trailing edge 148, with a steam channel 150 being defined between the leading edge 146 and the trailing edge 148. The outlet guide vane 72 may be formed with an airfoil shaped profile similar to that of the diffuser strut 74 as shown in FIG. 5. Similar to the diffuser strut 74, the outlet guide vane 72 includes a plurality of outlets 152 arranged through the trailing edge 148. A steam passage 154 is connected in fluid communication with the steam channel 150 through the diffuser outer casing 100 to deliver the steam 120 to the steam channel 150. The steam passage 154, while not shown in FIG. 4, is connected to the steam source 116 or to the steam passage 118 to deliver the steam 120 to the steam channel 150. Thus, the steam 120 delivered to the steam channel 150 can be injected through the outlets 152 into the diffuser 25, where the steam 120 can mix with the compressed air 82 passing through the diffuser 25.

Figure 6:
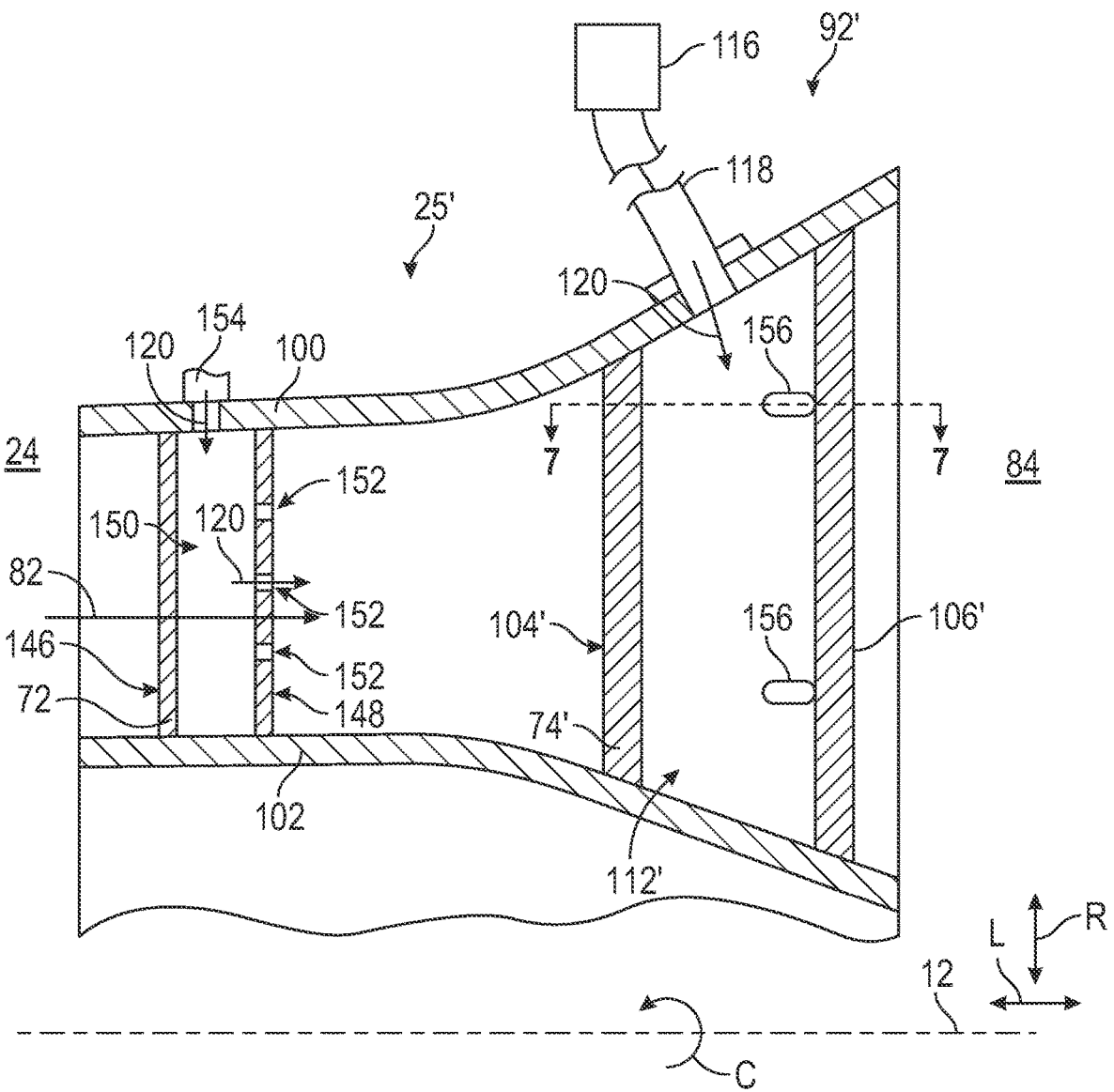
FIG. 6 is an alternate arrangement of the diffuser to that shown in FIG. 4, according to another aspect of the present disclosure.

FIG. 6 is an alternate arrangement of the diffuser 25 to that shown in FIG. 4, according to another aspect of the present disclosure. In the FIG. 6 aspect, component parts that are the same as those of the FIG. 4 aspect are labeled with the same reference numerals. In the FIG. 6 aspect, a steam injection system 92' is included and is similar to the steam injection system 92 of FIG. 4. In FIG. 6, however, a diffuser strut 74', which is an alternate arrangement to the diffuser strut 74 of FIG. 4, is included, and defines a part of the steam injection system 92'. Thus, the steam injection system 92' includes the diffusor strut 74', the steam source 116, and the steam passage 118, and may alternatively also include the outlet guide vane 72. Similar to the FIG. 4 aspect, the diffuser strut 74' includes a leading edge 104', a trailing edge 106', and a steam channel 112'.

Figure 7:
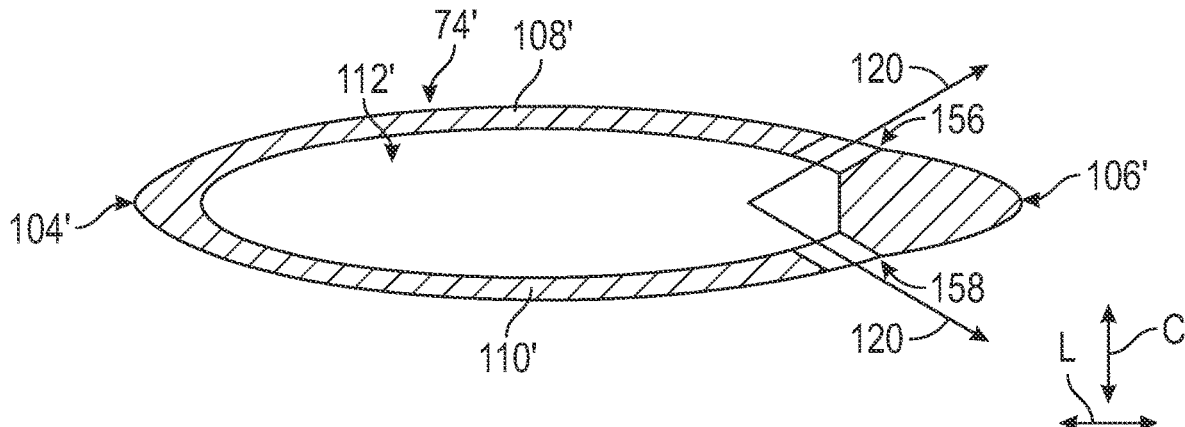
FIG. 7 is a cross-sectional view of a diffuser strut, taken at plane 7-7 of FIG. 6, according to another aspect of the present disclosure.

FIG. 7 is a cross-sectional view of the diffuser strut 74' taken at plane 7-7 of FIG. 6. Similar to the FIG. 5 aspect, the diffuser strut 74' may have an airfoil shaped profile and includes a first side wall 108' and a second side wall 110', with the steam channel 112' defined therebetween. In contrast to the FIG. 4 and FIG. 5 aspects, the FIG. 6 and FIG. 7 aspects include side wall outlets 156 through a downstream end of the first side wall 108', and side wall outlets 158 (FIG. 7) through a downstream end of the second side wall 110'. The side wall outlets 156 and the side wall outlets 158 provide for directing the flow of steam 120 from the steam channel 112' in both the longitudinal direction L and in the circumferential direction C so as to provide for a lateral spread of the steam 120 into the plenum 84.

Figure 8:
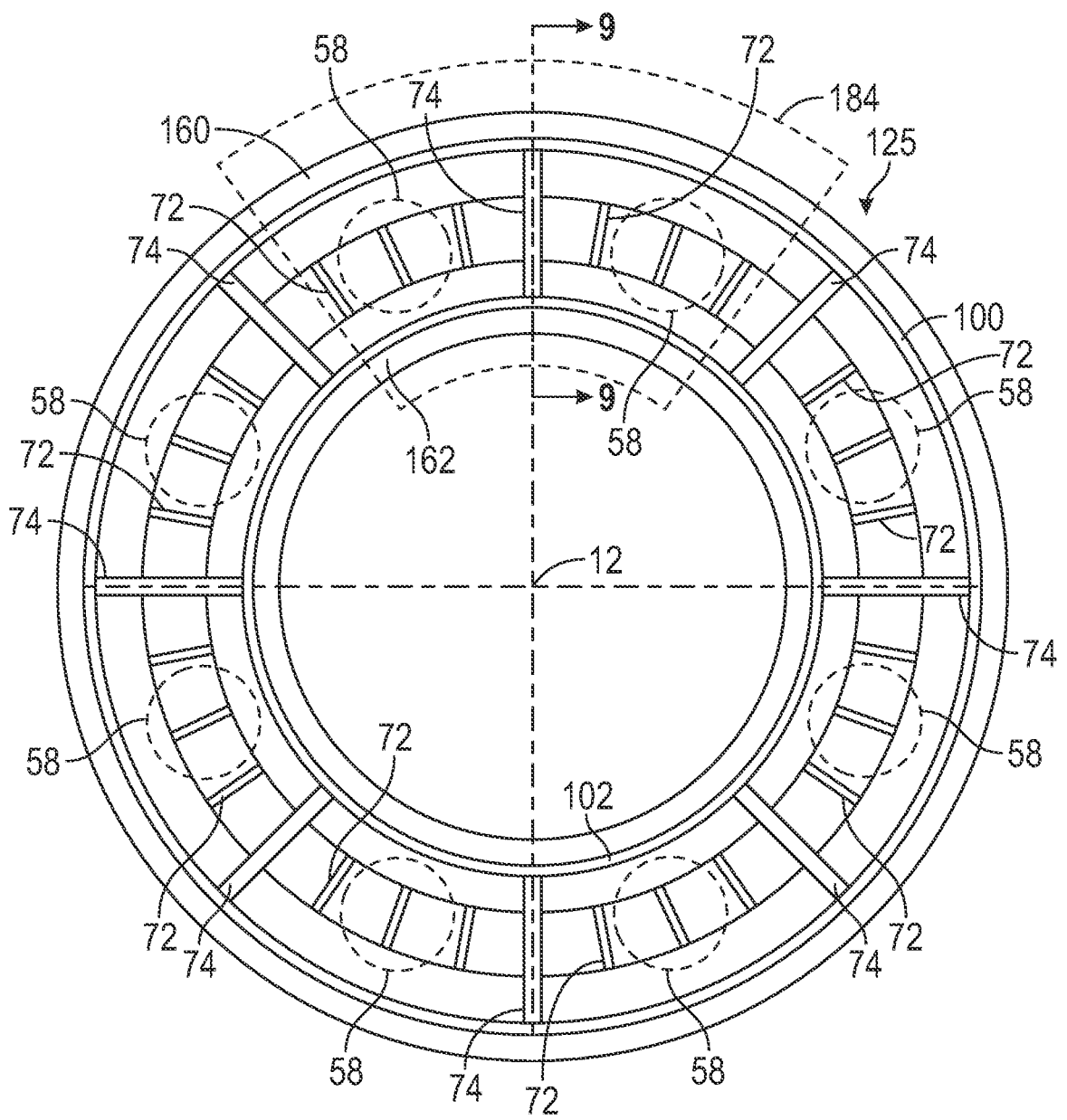
FIG. 8 is a forward-looking view of an alternate diffuser to that shown in FIG. 3, according to an aspect of the present disclosure.

FIG. 8 is a forward-looking view of an alternate diffuser 125 to that shown in FIG. 3, according to another aspect of the present disclosure. The FIG. 8 aspect is similar to the FIG. 3 aspect and, therefore, elements in FIG. 8 that are the same as those of FIG. 3 are labeled with the same reference numerals. In the FIG. 8 aspect, however, the diffuser 125 is seen to include an outer steam manifold 160 and an inner steam manifold 162. The outer steam manifold 160 and the inner steam manifold 162 may also be referred to as steam channels. The diffusor 125 may, however, include either of the outer steam manifold 160 or the inner steam manifold 162 rather than both. The outer steam manifold 160 extends circumferentially about the longitudinal centerline axis 12 and is arranged at the diffuser outer casing 100. Similarly, the inner steam manifold 162 extends circumferentially about the longitudinal centerline axis 12 and is arranged at the diffuser inner casing 102. Either of the outer steam manifold 160 or the inner steam manifold 162, however, need not extend circumferentially completely about the longitudinal centerline axis 12, and, instead, may only extend partially about the longitudinal centerline axis 12. In addition, the outer steam manifold 160 or the inner steam manifold 162 may constitute multiple outer steam manifold portions that extend only partially about the longitudinal centerline axis 12.

Figure 9:
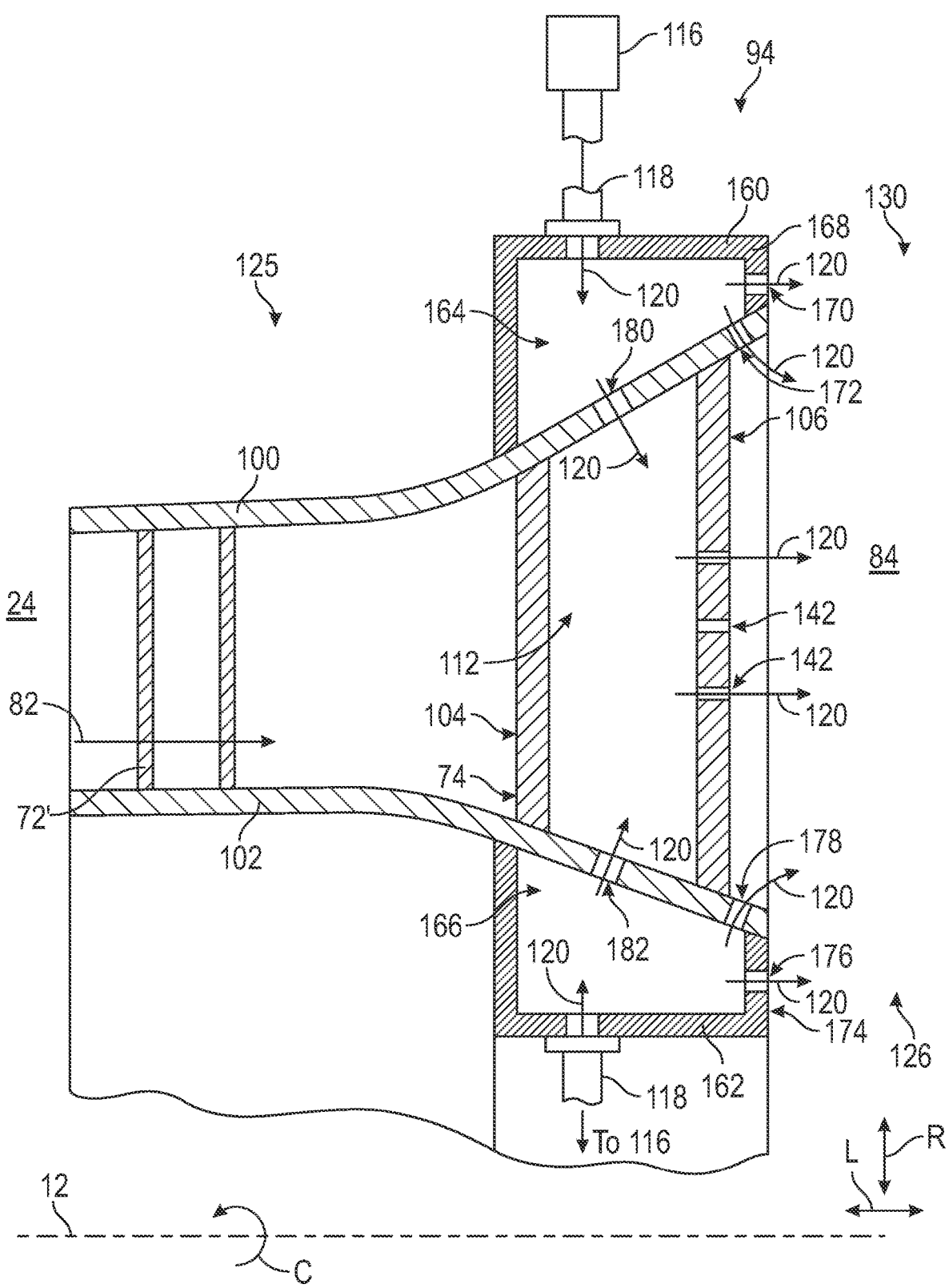
FIG. 9 is a partial cross-sectional view of the diffuser of FIG. 8, taken at plane 9-9, according to another aspect of the present disclosure.

FIG. 9 is a partial cross-sectional view of the diffuser 125 of FIG. 8, taken at plane 9-9, according to another aspect of the present disclosure. In the FIG. 9 aspect, a steam injection system 94 may include the outer steam manifold 160, the inner steam manifold 162, the steam source 116, and the steam passage 118. As seen in FIG. 9, the outer steam manifold 160 may be connected to the diffuser outer casing 100, and the inner steam manifold 162 may be connected to the diffuser inner casing 102. The outer steam manifold 160 includes an outer steam channel 164, and the inner steam manifold 162 includes an inner steam channel 166. The outer steam manifold 160 is connected to the steam source 116 via the steam passage 118 to provide the steam 120 to the outer steam channel 164. Similarly, the inner steam manifold 162 is connected to the steam source 116 via the steam passage 118 to provide the steam 120 to the inner steam channel 166. The outer steam manifold 160 also includes a downstream wall 168 that includes at least one outer manifold outlet 170. The steam 120 provided to the outer steam channel 164 can then flow through the at least one outer manifold outlet 170 into the plenum 84. In addition, the diffuser outer casing 100 may include at least one outer casing outlet 172 to provide a flow of the steam 120 from the outer steam channel 164 into the plenum 84 through the diffuser outer casing 100. Similarly, the inner steam manifold 162 also includes a downstream wall 174 that includes at least one inner manifold outlet 176. The steam 120 provided to the inner steam channel 166 can then flow through the at least one inner manifold outlet 176 into the plenum 84. In addition, the diffuser inner casing 102 may include at least one inner casing outlet 178 to provide a flow of the steam 120 from the inner steam channel 166 into the plenum 84 through the diffuser inner casing 102.

In the aspect of FIGS. 8 and 9, the diffuser strut 74 may also include the steam channel 112, and the middle outlets 142, and the diffuser strut 74 may also define a part of the steam injection system 94. A steam passage 180 through the diffuser outer casing 100 provides fluid communication between the outer steam channel 164 of the outer steam manifold 160 and the steam channel 112 of the diffuser strut 74. Similarly, a steam passage 182 through the diffuser inner casing 102 provides fluid communication between the inner steam channel 166 of the inner steam manifold 162 and the steam channel 112 of the diffuser strut 74. The steam 120 provided to the steam channel 112 then flows through the middle outlets 142 into the plenum 84. While FIG. 9 depicts only the middle outlets 142 through the trailing edge 106 of the diffuser strut 74, any of the outlets 114 (FIG. 4), the angled outlets 122 (FIG. 4), or the side wall outlets 156 (FIG. 6) and the outlets 158 (FIG. 6) may be included in the diffuser strut 74, either in lieu of, or in addition to the middle outlets 142. In addition, while FIG. 9 depicts the outlet guide vane 72' as not including the outlets 152 as shown in FIG. 6, the outlet guide vane 72' of FIG. 9 may be the same as the outlet guide vane 72 shown in FIG. 6 and may also define a part of the steam injection system 94. In the FIG. 9 aspect, the outer manifold outlets 170 and inner manifold outlets 176 may be sized differently from the middle outlets 142. For example, the middle outlets 142 may have a smaller diameter than the outer manifold outlets 170, or may have a smaller diameter than the inner manifold outlets 176. As a result, less steam 120 can be injected into the plenum 84 from the middle outlets 142 as compared with the amount of steam injected into the plenum 84 from each of the outer manifold outlets 170 or from the inner manifold outlets 176. In this manner, a greater amount of the steam 120 can be injected into the plenum 84 towards the outer side 130 of the plenum 84 or to the inner side 126 of the plenum 84 than that being injected toward the swirler assemblies 58.

Figure 10:
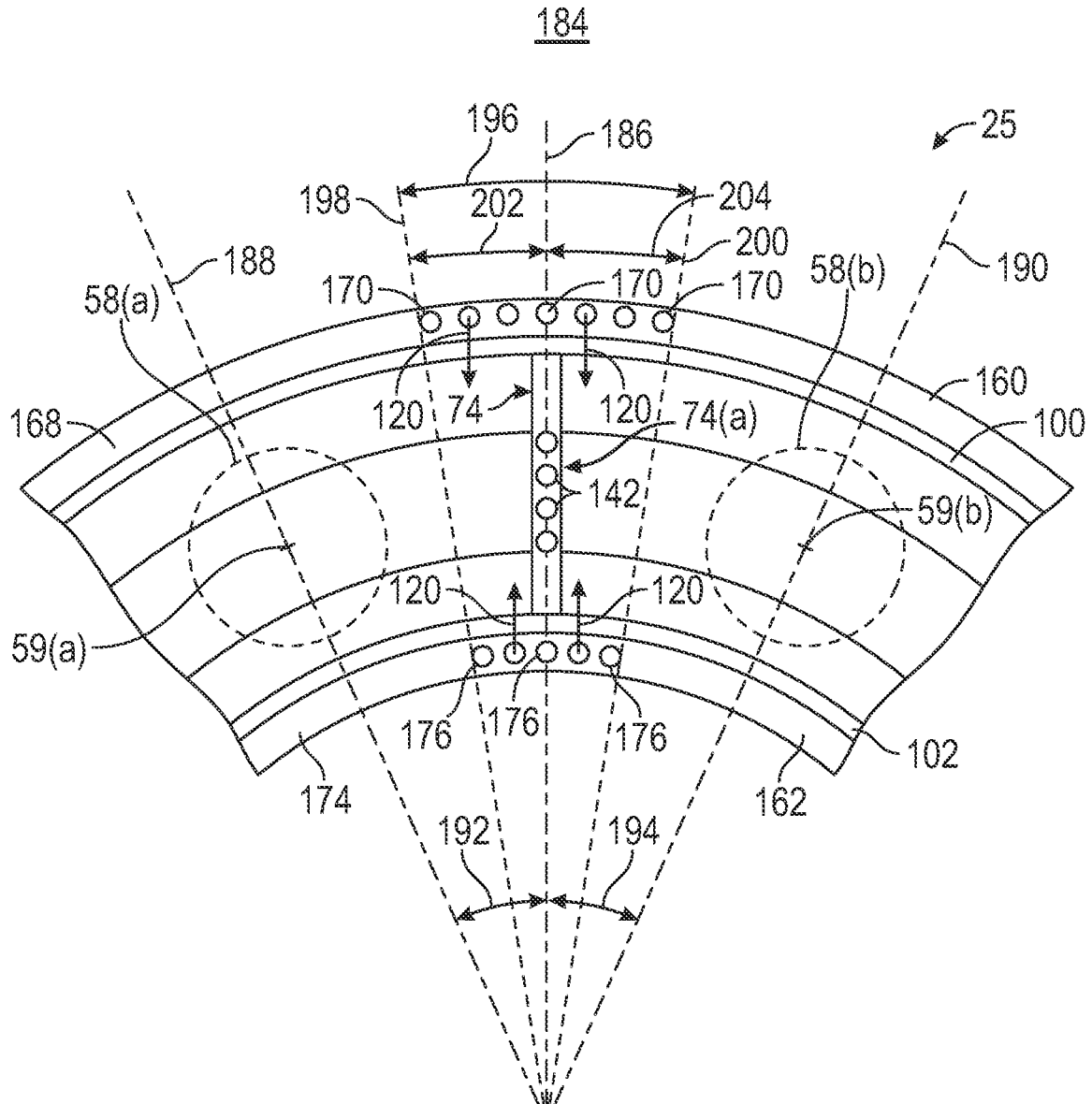
FIG. 10 is an enlarged view of a portion of the diffuser, taken at detail view 184 of FIG. 8, according to an aspect of the present disclosure.

FIG. 10 is an enlarged view of a portion of the diffuser 25, taken at detail view 184 of FIG. 8, according to an aspect of the present disclosure. FIG. 10 depicts an example of a circumferential arrangement of the outer manifold outlets 170 and the inner manifold outlets 176 relative to the diffuser strut 74 and a respective pair of the swirler assemblies 58, constituted by the first swirler assembly 58(*a*) and the second swirler assembly 58(*b*), adjacent to the diffuser strut 74. In FIG. 10, the outlet guide vanes 72 shown in FIG. 3 have been removed merely for clarity. As shown in FIG. 10, the outer manifold outlets 170 through the downstream wall 168 of the outer steam manifold 160 are arranged circumferentially through the downstream wall 168 with respect to the longitudinal centerline axis 12. A reference line 186 extending radially outward from the longitudinal centerline axis 12 in the radial direction R and through a center of the diffuser strut 74 may define a circumferential location of the diffuser strut 74. A reference line 188 extending radially outward from the longitudinal centerline axis 12 and through a centerline axis 59(*a*) of the first swirler assembly 58(*a*) may define a circumferential location of the first swirler assembly 58(*a*) with respect to the circumferential location of the diffuser strut 74. For example, the reference line 188 may be angularly offset in the circumferential direction C from the reference line 186 by a circumferential angle 192.

Similarly, a reference line 190 extending radially outward from the longitudinal centerline axis 12 in the radial direction R and through a centerline axis 59(*b*) of the second swirler assembly 58(*b*) may define a circumferential location of the second swirler assembly 58(*b*) with respect to the diffuser strut 74. For example, the reference line 190 may be angularly offset in the circumferential direction C from the reference line 186 by a circumferential angle 194, where the circumferential angle 192 and the circumferential angle 194 are the same angular amount such that the diffuser strut 74 is located at a median circumferential location between the first swirler assembly 58(*a*) and the second swirler assembly 58(*b*).

A strut injection zone 196 is defined circumferentially between a reference line 198 and a reference line 200. The reference line 198 extends radially outward from the longitudinal centerline axis 12 and is angularly offset from the reference line 186 by a circumferential angle 202. The reference line 200 extends radially outward from the longitudinal centerline axis 12 and is angularly offset in the circumferential direction C from the reference line 186 by a circumferential angle 204, where the circumferential angle 202 and the circumferential angle 204 are the same angular amount. Thus, the strut injection zone 196 is defined between the respective pair of swirler assemblies constituted by the first swirler assembly 58(*a*) and the second swirler assembly 58(*b*). The outer manifold outlets 170 are arranged within the strut injection zone 196 so as to inject the steam 120 therefrom into the strut injection zone 196 circumferentially between the respective pair of the swirler assemblies 58. Similarly, the inner manifold outlets 176 are arranged within the strut injection zone 196 so as to inject the steam 120 therefrom into the plenum 84 circumferentially between the respective pair of the swirler assemblies 58. The middle outlets 142 may also inject the steam 120 therefrom into the plenum 84 between the pair of swirler assemblies 58. However, the diffuser strut 74 may omit any steam outlets (i.e., may not include the steam channel 112 or any of the outlets 114, the angled outlets 122, and the middle outlets

142), and, instead, the steam 120 can be provided to the plenum 84 only via the outer manifold outlets 170 and the inner manifold outlets 176.

Figure 11:
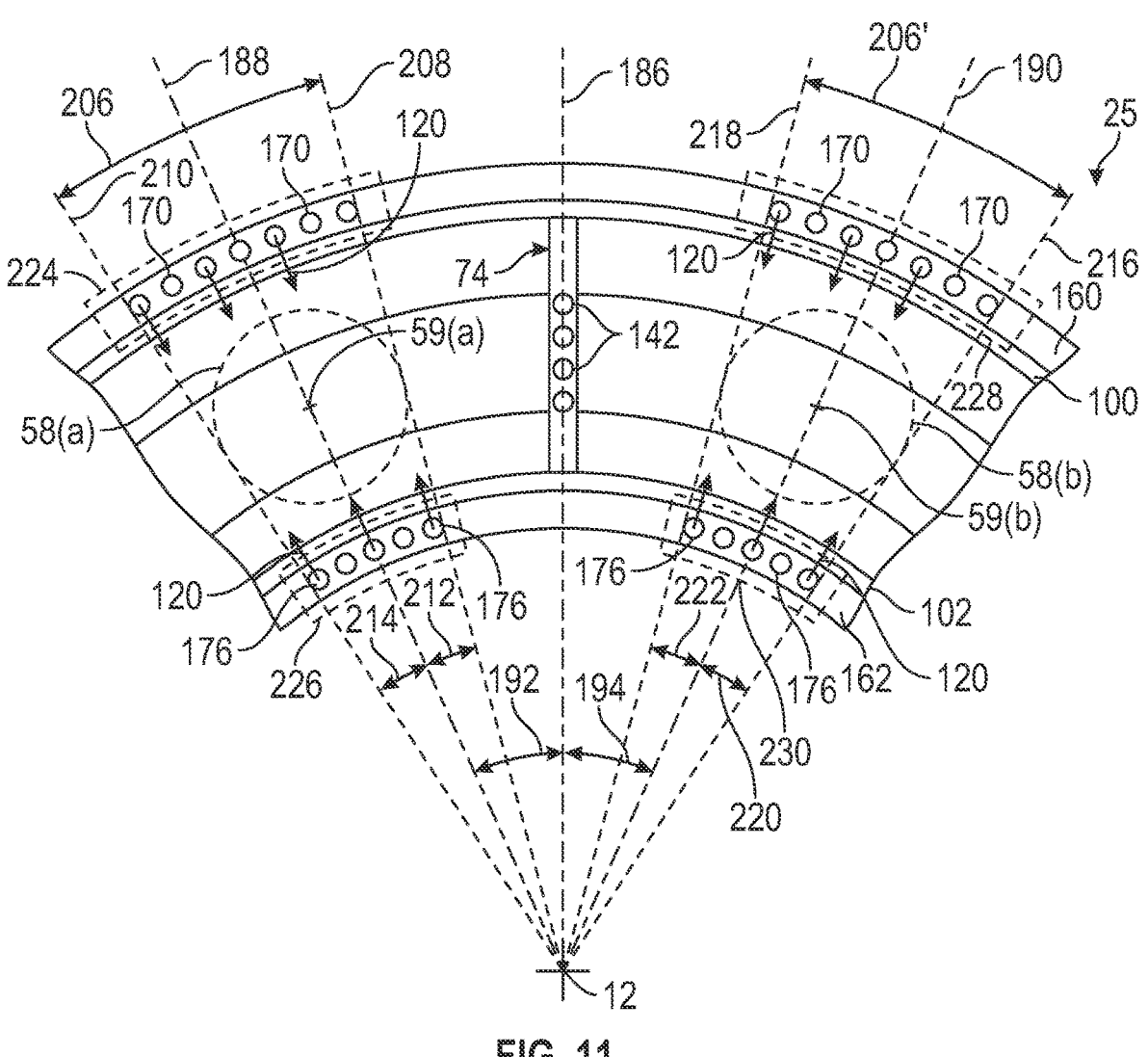
FIG. 11 depicts an alternate arrangement of an alternate diffuser to that shown in FIG. 10, according to another aspect of the present disclosure.

FIG. 11 depicts an alternate arrangement of an alternate diffuser 25 to that shown in FIG. 10, according to another aspect of the present disclosure. In contrast to the FIG. 10 aspect, in which the outer manifold outlets 170 and the inner manifold outlets 176 are arranged within the strut injection zone 196, in FIG. 11, the outer manifold outlets 170 and the inner manifold outlets 176 are arranged within a swirler injection zone 206 adjacent to a respective swirler assembly 58. With respect to the first swirler assembly 58(*a*), the swirler injection zone 206 is defined relative to the reference line 188. The swirler injection zone 206 may be defined with regard to a reference line 208 extending radially outward from the longitudinal centerline axis 12 and angularly offset from the reference line 188 by a circumferential angle 212, and with regard to a reference line 210 extending radially outward from the longitudinal centerline axis 12 and angularly offset from the reference line 188 by a circumferential angle 214. The circumferential angle 212 and the circumferential angle 214 may be the same angular amount.

Similarly, with respect to the second swirler assembly 58(*b*), a swirler injection zone 206' may be defined with respect to the reference line 190, and may be defined by reference line 216 extending radially outward from the longitudinal centerline axis 12 and angularly offset from the reference line 190 by a circumferential angle 220, and with regard to a reference line 218 extending radially outward from the longitudinal centerline axis 12 and angularly offset from the reference line 190 by a circumferential angle 222. The circumferential angle 220 and the circumferential angle 222 may be the same angular amount. In addition, the circumferential angle 212 and the circumferential angle 220 may be the same angular amount or may be different angular amounts from one another, and the circumferential angle 214 and the circumferential angle 222 may also be the same angular amount or may be different angular amounts from each other.

As shown in FIG. 11, with respect to the first swirler assembly 58(*a*), a first group 224 of the outer manifold outlets 170 is arranged within the swirler injection zone 206 and a first group 226 of the inner manifold outlets 176 is also arranged within the swirler injection zone 206. Both the first group 224 of the outer manifold outlets 170 and the first group 226 of the inner manifold outlets 176 within the swirler injection zone 206 inject the steam 120 into the swirler injection zone 206. Similarly, with regard to the second swirler assembly 58(*b*), a second group 228 of the outer manifold outlets 170 is arranged within the swirler injection zone 206' and a second group 230 of the inner manifold outlets 176 is also arranged within the swirler injection zone 206'. Both the second group 228 of the outer manifold outlets 170 and the second group 230 of the inner manifold outlets 176 within the swirler injection zone 206' inject the steam 120 into the swirler injection zone 206'. Of course, the present disclosure is not limited to either the FIG. 10 aspect or the FIG. 11 aspect, and the FIG. 10 aspect and the FIG. 11 aspect may be combined such that the outer manifold outlets 170 are arranged in each of the strut injection zone 196 (FIG. 10), and the swirler injection zone 206, and the swirler injection zone 206'. The inner manifold outlets 176 may also be similarly arranged by combining the FIG. 10 and the FIG. 11 aspects. Further, the outer manifold outlets 170 and the inner manifold outlets 176 may be arranged circumferentially completely around the longitudinal centerline axis 12.

Figure 12:
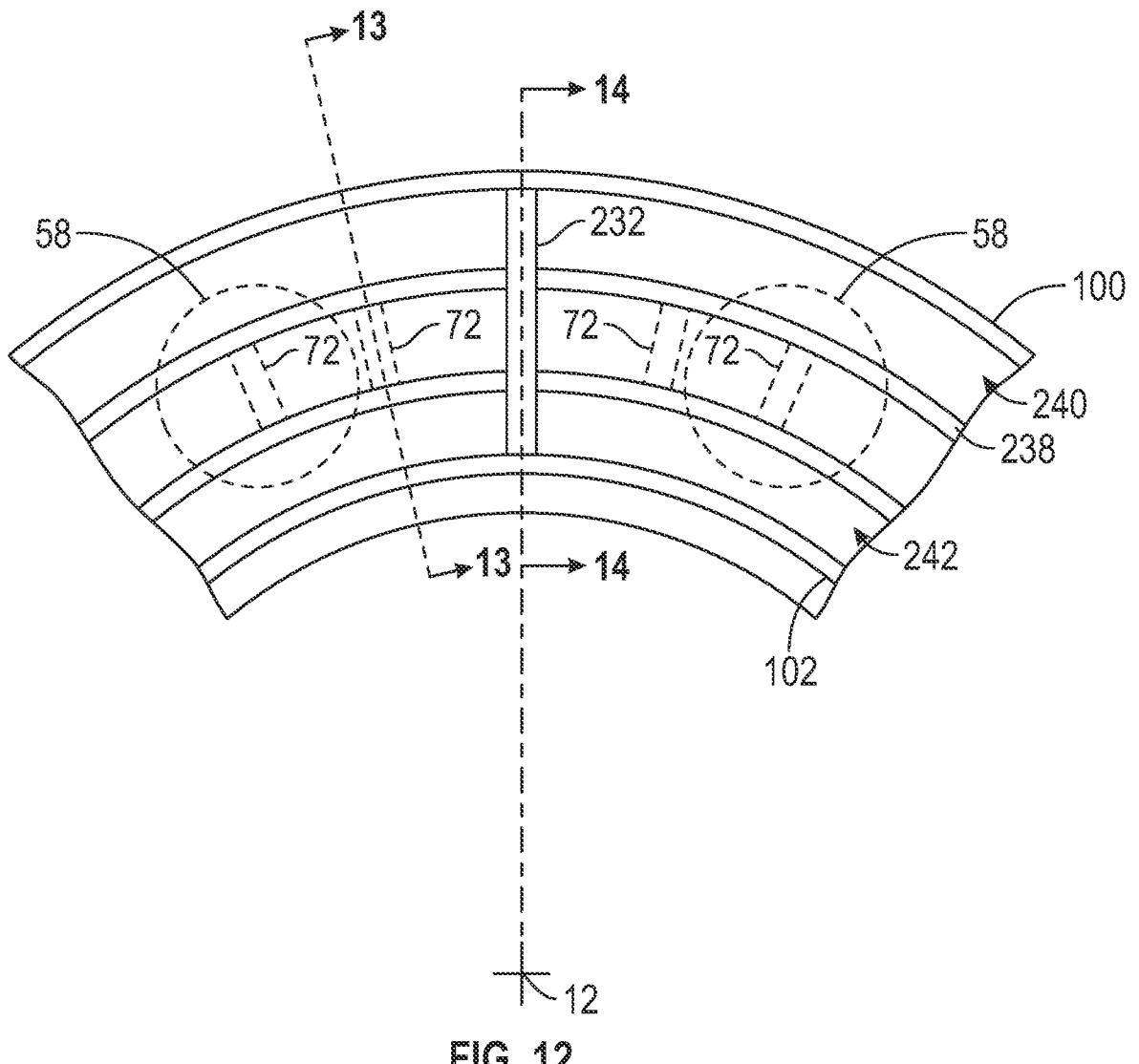
FIG. 12 depicts a forward-looking view, similar to the detail view 184 of FIG. 9, of a portion of an alternate arrangement of a diffuser, according to another aspect of the present disclosure.
Figure 13:
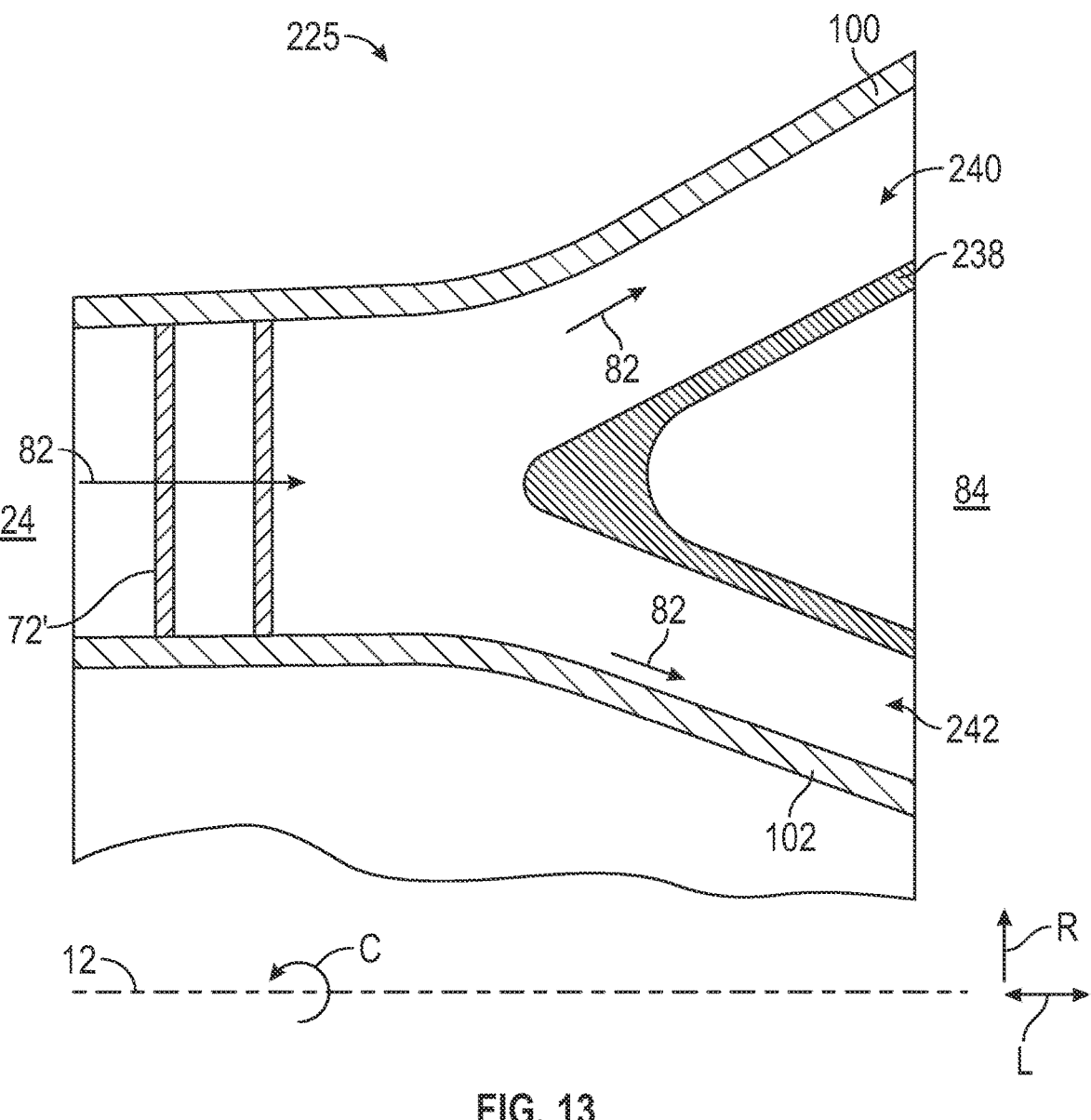
FIG. 13 is a partial cross-sectional view of the alternate diffuser, taken at plane 13-13 of FIG. 12, according to another aspect of the present disclosure.

FIG. 12 depicts a forward-looking view, similar to the detail view 184 of FIG. 10, of a portion of an alternate arrangement of a diffuser 225, according to another aspect of the present disclosure. FIG. 13 is a partial cross-sectional view of the alternate diffuser 225 taken at plane 13-13 of FIG. 12, according to another aspect of the present disclosure. Referring collectively to FIG. 12 and to FIG. 13, the diffuser 225 of FIG. 12 and FIG. 13 includes a splitter 238. The splitter 238 extends circumferentially about the longitudinal centerline axis 12 so as to define a first (outer) diffuser flow passage 240 through which the compressed air 82 flows, and a second (inner) diffuser flow passage 242 separate from the first (outer) diffuser flow passage 240 through which the compressed air 82 flows. Thus, the inclusion of the splitter 238 forms a multi-passage diffuser.

Figure 14:
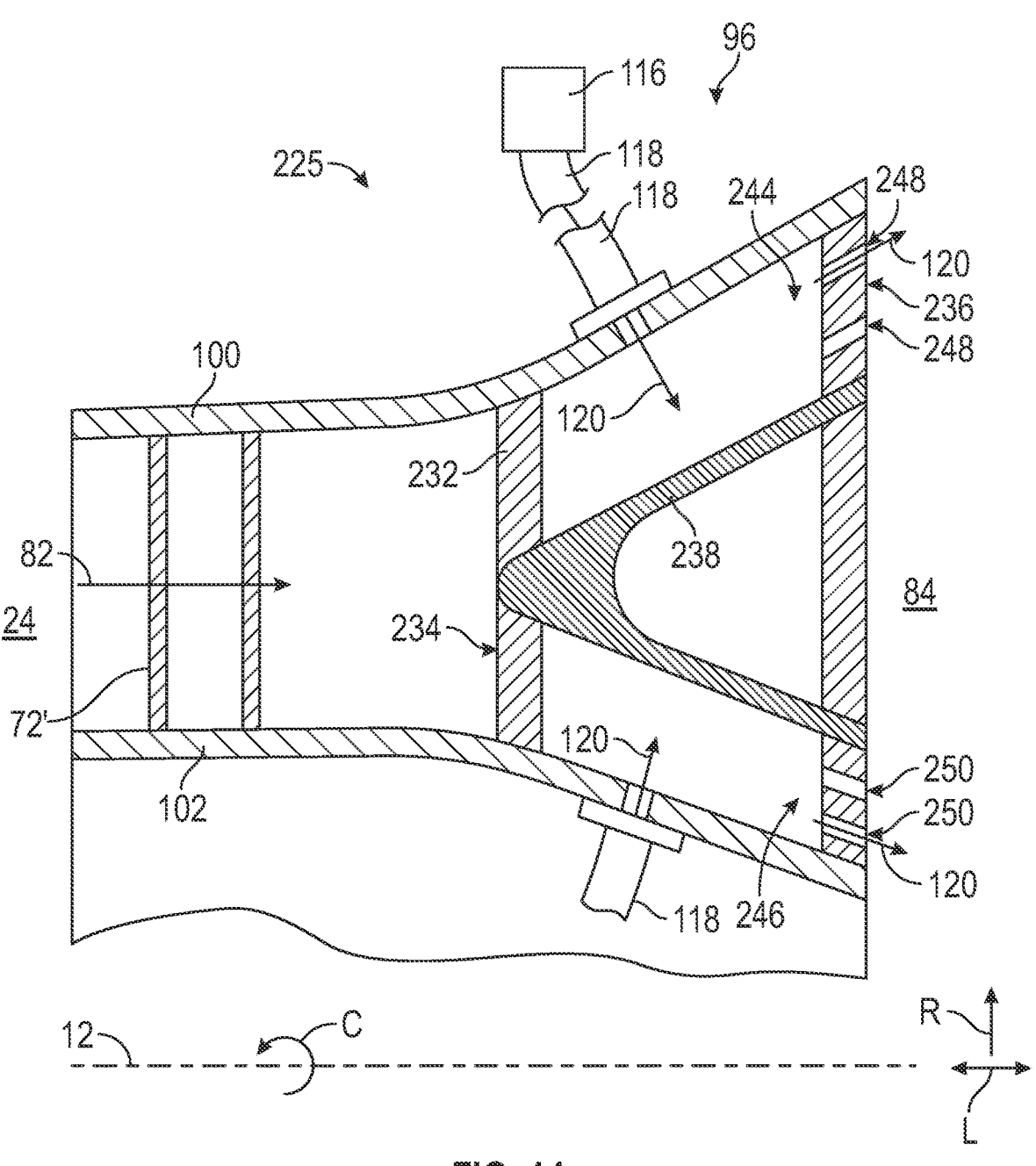
FIG. 14 is a partial cross-sectional view of the alternate diffuser, taken at plane 14-14 of FIG. 12, according to an aspect of the present disclosure.

FIG. 14 is a partial cross-sectional view of the alternate diffuser 225, taken at plane 14-14 in FIG. 12. The cross-sectional view of FIG. 14 is taken through a diffuser strut 232. The diffuser strut 232 may be similar to the diffuser strut 74 of FIG. 4 and FIG. 5, but with the splitter 238 extending through the diffuser strut 232. The diffuser strut 232, the steam source 116, and the steam passage 118 define a steam injection system 96 in FIG. 14. In addition, the outlet guide vane 72' of FIG. 14 may be similar to the outlet guide vane 72' of FIG. 6 and may also define a part of the steam injection system 96. The diffuser strut 232 includes a leading edge 234 that is similar to the leading edge 104 (FIG. 4 and FIG. 5) and a trailing edge 236 that is similar to the trailing edge 106 (FIG. 4 and FIG. 5). With the inclusion of the splitter 238 through the diffuser strut 232, an outer steam channel 244 is defined between the leading edge 234, the trailing edge 236, the diffuser outer casing 100, and the splitter 238. In addition, an inner steam channel 246 is defined between the leading edge 234, the trailing edge 236, the diffuser inner casing 102, and the splitter 238. The outer steam channel 244 is connected to the steam source 116 via the steam passage 118 to provide the steam 120 from the steam source 116 to the outer steam channel 244. Similarly, the inner steam channel 246 is connected to the steam source 116 via the steam passage 118 to provide the steam 120 from the steam source 116 to the inner steam channel 246. The diffuser strut 232 includes at least one outer passage outlet 248 through the trailing edge 236 at the first (outer) diffuser flow passage 240 (FIG. 13) to provide a flow of the steam 120 from the outer steam channel 244 to the plenum 84. Similarly, the diffuser strut 232 includes at least one inner passage outlet 250 through the trailing edge 236 at the second (inner) diffuser flow passage 242 (FIG. 13) to provide a flow of the steam 120 from the inner steam channel 246 to the plenum 84.

Figure 15:
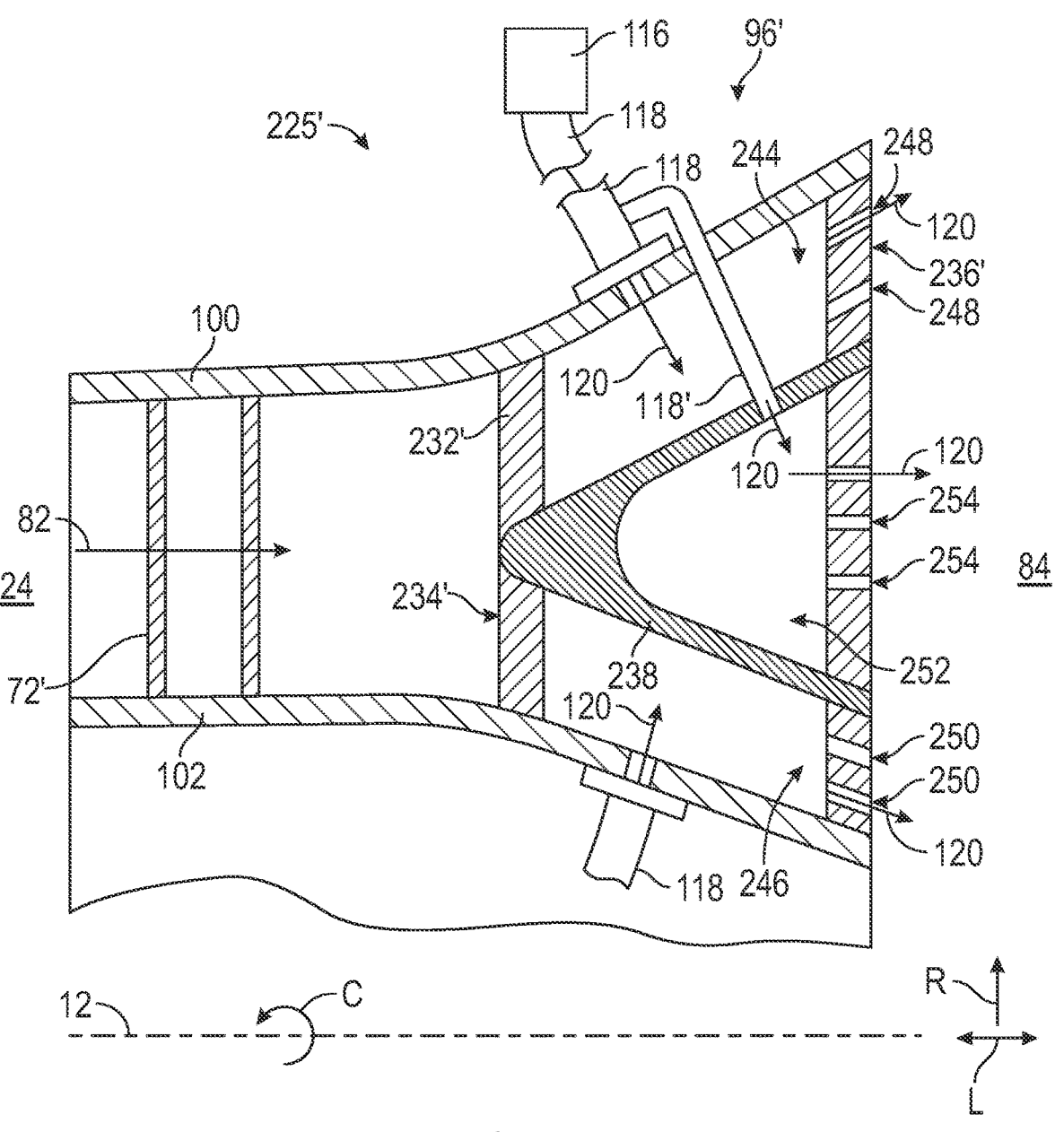
FIG. 15 is a partial cross-sectional view of an alternate arrangement of a diffuser, according to another aspect of the present disclosure.

FIG. 15 is a partial cross-sectional view of an alternate arrangement of a diffuser 225' to the diffuser 225 of FIG. 14, according to another aspect of the present disclosure. The FIG. 15 aspect is similar to the FIG. 14 aspect, and, therefore, common elements include the same reference numerals. In FIG. 15, however, an alternate arrangement of a diffuser strut 232' is shown and includes a leading edge 234' and a trailing edge 236'. In addition, the splitter 238 defines a splitter steam manifold 252 between the splitter 238 and the trailing edge 236', and the trailing edge 236' at the splitter steam manifold 252 includes at least one splitter steam outlet 254. The splitter steam manifold 252 may also be referred to as a steam channel. A branch steam passage 118' connects the steam source 116 to the splitter steam manifold 252 to provide the steam 120 to the splitter steam manifold 252. The steam 120 within the splitter steam manifold 252 is then provided through the at least one splitter steam outlet 254 to inject the steam 120 into the plenum 84. Thus, in FIG. 15, a steam injection system 96' may include the diffuser strut 232', the steam source 116, the steam passage 118, and the branch steam passage 118'. While FIG. 15 depicts an arrangement that includes both the outer steam channel 244 and the inner steam channel 246 in conjunction with the splitter steam manifold 252, an arrangement can be provided in which the outer steam channel 244 and the inner steam channel 246 are omitted, and only the splitter steam manifold 252 is included. In this case, the steam passage 118' is included to provide the flow of the steam 120 to the splitter steam manifold 252, while the steam passage 118 providing the flow of steam 120 to the outer steam channel 244 and to the inner steam channel 246 may be omitted, and the outer passage outlets 248 and the inner passage outlets 250 may also be omitted. Of course, the disclosure is not limited to any one of the depicted aspects and other combinations of the disclosed aspects can be included together with one another instead.

Figure 16:
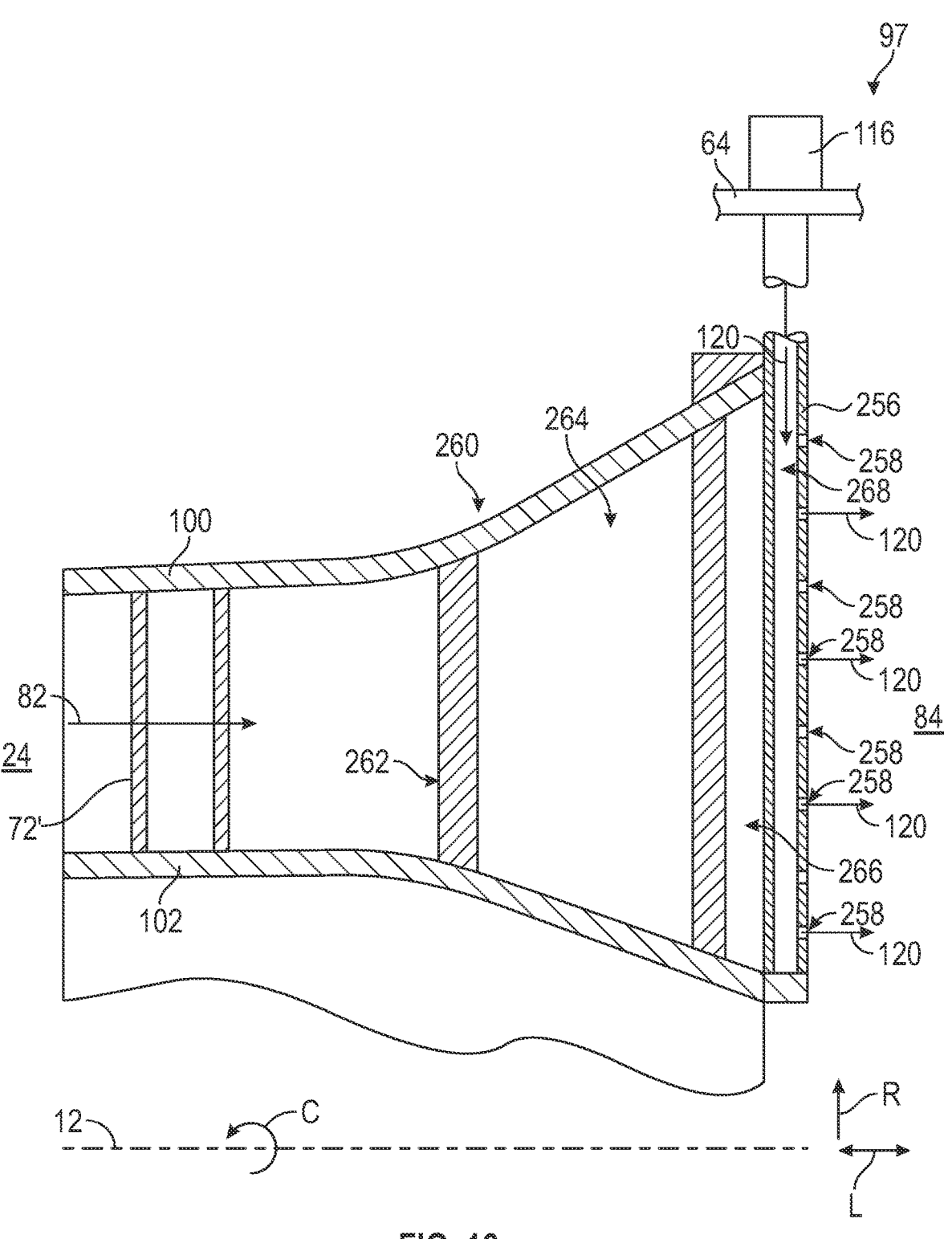
FIG. 16 is a partial cross-sectional view of another alternate diffuser, according to another aspect of the present disclosure.

FIG. 16 is a partial cross-sectional view of another alternate diffuser 260, according to another aspect of the present disclosure. In the FIG. 16 aspect, an alternate steam injection system 97 is included for a diffuser 260. The diffuser 260 includes the outlet guide vanes 72 without the steam channel 150, and a diffuser strut 262. The diffuser strut 262 may have a hollow core 264 similar to the diffuser strut 74 shown in FIG. 5, but the hollow core 264 does not function as a steam channel, like the steam channel 112 of FIG. 5. However, the diffuser strut 74 (FIG. 4) and the outlet guide vanes 72 may be included in the FIG. 16 aspect. When the diffuser strut 262 and the outlet guide vanes 72' are included as shown in FIG. 16, to provide the steam 120 to the flow of compressed air 82 passing through the diffuser 260, at least one steam injection nozzle assembly 256 is connected to a downstream end 266 of the diffuser 260. The steam injection nozzle 256 and the steam source 116 define the steam injection system 97. The steam injection nozzle assembly 256 may include a steam channel 268 that may be a generally tubular shaped housing, and includes a plurality of steam outlets 258 therethrough. The steam injection nozzle assembly 256 may extend through the annular combustor outer casing 64 and connect with the steam source 116. The steam 120 from the steam source 116 flows through the steam channel 268 and through the steam outlets 258 to inject the steam 120 into the plenum 84 at the downstream end 266 of the diffuser 260. While one steam injection nozzle assembly 256 is shown in the cross-sectional view of FIG. 16, a plurality of the steam injection nozzle assemblies 256 may be arranged circumferentially spaced apart about the downstream end 266 of the diffuser 260. For example, a respective steam injection nozzle assembly 256 may be arranged circumferentially aligned with a respective diffusor strut 74, where the diffuser struts 74 are spaced apart as shown, for example, in FIG. 3. Alternatively, respective ones of the plurality of steam injection nozzle assemblies 256 could be arranged circumferentially aligned with the respective ones of the swirler assemblies 58.

Each of the foregoing arrangements provides for the injection of steam into the plenum upstream of the swirler assemblies via the diffuser. By injecting steam into the plenum from the diffuser, the steam can more readily mix with the compressed air flowing through the diffuser before the mixture of the compressed air and the steam flows into the swirler assemblies, thereby reducing the potential for a flameout condition. In addition, the injection of the steam into the plenum from the diffuser provides better mixing of the compressed air and the steam that flows through the flow passages surrounding the combustion chamber before passing through the dilution openings of the inner and outer liners and into the combustion chamber. The better mixture of the air and steam can, therefore, provide for a better reduction of the CO and $NO_x$ emissions that may otherwise occur in the combustion chamber.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A gas turbine comprises a combustion section, and a diffuser arranged to provide a flow of compressed air from a compressor to the combustion section, the diffuser including a steam injection system that provides a flow of steam from the diffuser to the combustion section.

The gas turbine according to the preceding clause, wherein the diffuser includes at least one outlet guide vane arranged on an upstream side of the diffuser, the at least one outlet guide vane including at least one steam channel that provide a flow of steam therefrom into the diffuser.

The gas turbine according to any preceding clause, wherein the combustion section is an annular combustion section and includes (a) an annular combustor outer casing, (b) an annular combustor inner casing, and (c) a combustor arranged between the annular combustor outer casing and the annular combustor inner casing, the annular combustor inner casing and the annular combustor outer casing defining a plenum surrounding the combustor, the steam injection system being arranged to inject steam into the plenum.

The gas turbine according to any preceding clause, wherein the diffuser includes at least one steam injection nozzle assembly arranged on a downstream end of the diffuser, the at least one steam injection nozzle assembly having at least one steam injection channel and at least one outlet for injecting steam into the plenum.

The gas turbine according to any preceding clause, wherein the diffuser includes (i) a diffuser outer casing, (ii) a diffuser inner casing, and (iii) at least one diffuser strut connecting the diffuser outer casing and the diffuser inner casing, the steam injection system including at least one steam channel having at least one outlet that provides a flow of steam therethrough.

The gas turbine according to any preceding clause, wherein the at least one steam channel includes an outer steam manifold arranged at the diffuser outer casing, and an inner steam manifold arranged at the diffuser inner casing.

The gas turbine according to any preceding clause, wherein the at least one outlet includes at least one outer manifold outlet arranged to provide steam therethrough from the outer steam manifold into the plenum, and at least one inner manifold outlet arranged to provide steam therethrough from the inner steam manifold into the plenum.

The gas turbine according to any preceding clause, wherein the at least one outlet further includes at least one outer casing outlet through the outer casing or at least one inner casing outlet through the inner casing.

The gas turbine according to any preceding clause, wherein the diffuser further includes at least one outer casing steam passage providing fluid communication between the outer steam manifold and the steam channel of the at least one diffuser strut, or at least one inner casing steam passage providing fluid communication between the inner steam manifold and the steam channel of the at least one diffuser strut.

The gas turbine according to any preceding clause, wherein the combustor further includes (i) an annular outer liner, (ii) an annular inner liner, (iii) an annular dome connected between the annular outer liner and the annular inner liner, the annular outer liner, the annular inner liner, and the annular dome defining an annular combustion chamber therebetween, and (iv) a plurality of swirler assemblies connected to the annular dome and circumferentially spaced apart from one another, each diffuser strut among the at least one diffuser strut being spaced apart circumferentially from one another and being arranged circumferentially offset with respect to a circumferential location of the plurality of swirler assemblies so as to be arranged between a respective pair of the plurality of swirler assemblies.

The gas turbine according to any preceding clause, wherein the at least one steam channel is included within the at least one diffuser strut, the at least one outlet provides a flow of steam therethrough to inject the steam into the plenum circumferentially between the respective pair of the plurality of swirler assemblies.

The gas turbine according to any preceding clause, wherein the at least one steam channel further includes an outer steam manifold arranged at the diffuser outer casing, and an inner steam manifold arranged at the diffuser inner casing, and the at least one outlet includes at least one outer manifold outlet arranged to provide steam from the outer steam manifold into the plenum, and at least one inner manifold outlet arranged to provide steam from the inner steam manifold into the plenum.

The gas turbine according to any preceding clause, wherein the at least one outer manifold outlet is arranged to inject steam in a strut injection zone defined circumferentially adjacent to the at least one diffuser strut and between the respective pair of the plurality of swirler assemblies, and the at least one inner manifold outlet is arranged to inject steam in the strut injection zone.

The gas turbine according to any preceding clause, wherein the at least one outer manifold outlet is arranged to inject steam in a swirler injection zone defined circumferentially adjacent to a swirler assembly among the plurality of swirler assemblies, and the at least one inner manifold outlet is arranged to inject steam in the swirler injection zone.

The gas turbine according to any preceding clause, wherein the at least one steam channel is included within the at least one diffuser strut, and the at least one outlet is arranged to inject steam from the at least one steam channel into the plenum.

The gas turbine according to any preceding clause, wherein the at least one outlet is arranged through a side wall of the at least one diffuser strut.

The gas turbine according to any preceding clause, wherein the at least one outlet is arranged through a trailing edge of the at least one diffuser strut.

The gas turbine according to any preceding clause, wherein the at least one outlet includes a first outlet arranged to direct the steam therefrom toward an outer side of the plenum, and a second outlet arranged to direct the steam therefrom toward an inner side of the plenum.

The gas turbine according to any preceding clause, wherein the first outlet is arranged adjacent to the diffuser outer casing, and the second outlet is arranged adjacent to the diffuser inner casing.

The gas turbine according to any preceding clause, wherein the diffuser is a multi-passage diffuser and includes at least one splitter defining a plurality of flow passages, including a first flow passage and a second flow passage, the splitter defining an outer steam channel in the diffuser strut for injecting steam from the first flow passage and an inner steam channel in the diffuser strut for injecting steam from the second flow passage.

The gas turbine according to any preceding clause, wherein the splitter includes at least one splitter steam manifold having at least one outlet that injects steam into the plenum.

The gas turbine according to any preceding clause, wherein the splitter steam manifold extends circumferentially about the diffuser.

The gas turbine according to any preceding clause, wherein the diffuser further includes a plurality of outlet guide vanes, at least one of the plurality of outlet guide vanes includes a steam channel therewithin and at least one outlet for providing a flow of steam from the steam channel into the diffuser flow passage.

The gas turbine according to any preceding clause further including a steam source and at least one steam passage, the at least one steam passage providing a flow of steam from the steam source to the diffusor steam injection system.

The gas turbine according to any preceding clause, wherein the at least one steam passage is arranged to provide the steam to the steam channel of the at least one diffuser strut.

The gas turbine according to any preceding clause, wherein the at least one steam passage is arranged to provide the flow of steam to the steam channel of the at least one outlet guide vane.

The gas turbine according to any preceding clause, wherein the diffuser includes (a) at least one diffuser strut that includes a steam channel and at least one outlet, and (b) at least one outlet guide vane that includes an outlet guide vane steam channel and at least one outlet guide vane outlet.

A diffuser for a gas turbine, including an outer casing extending circumferentially about a centerline axis, an inner casing extending circumferentially about the centerline axis, a diffuser flow passage being defined between the outer casing and the inner casing, and a plurality of diffuser struts connected between the outer casing and the inner casing, at least one diffuser strut among the plurality of diffuser struts including (a) a steam channel therewithin, and (b) at least one steam outlet in fluid communication with the steam channel.

The diffuser according to the preceding clause, wherein the diffuser further comprises at least one of an outer steam manifold connected to the outer casing or an inner steam manifold connected to the inner casing, wherein at least one of the outer casing or the inner casing includes a steam passage providing fluid communication between the outer steam manifold and the steam channel of the at least one diffuser strut or between the inner steam manifold and the steam channel of the at least one diffuser strut.

The diffuser according to any preceding clause, wherein the diffuser further includes a plurality of outlet guide vanes connected between the outer casing and the inner casing upstream of the at least one diffuser strut, at least one outlet guide vane among the plurality of outlet guide vanes including an outlet guide vane steam channel therewithin and at least one outlet guide vane steam outlet for providing a flow of steam from the outlet guide vane steam channel into the diffuser flow passage.

The diffuser according to the preceding clause, wherein the diffuser includes at least one outlet guide vane arranged on an upstream side of the diffuser, the at least one outlet guide vane including at least one steam channel that provide a flow of steam therefrom into the diffuser.

The diffuser according to any preceding clause, wherein the diffuser includes at least one steam injection nozzle assembly arranged on a downstream end of the diffuser, the at least one steam injection nozzle assembly having at least one steam injection channel and at least one outlet for injecting steam into the plenum.

The diffuser according to any preceding clause, wherein the diffuser includes (i) a diffuser outer casing, (ii) a diffuser inner casing, and (iii) at least one diffuser strut connecting the diffuser outer casing and the diffuser inner casing, the steam injection system including at least one steam channel having at least one outlet that provides a flow of steam therethrough.

The diffuser according to any preceding clause, wherein the at least one steam channel includes an outer steam manifold arranged at the diffuser outer casing, and an inner steam manifold arranged at the diffuser inner casing.

The diffuser according to any preceding clause, wherein the at least one outlet includes at least one outer manifold outlet arranged to provide steam therethrough from the outer steam manifold into the plenum, and at least one inner manifold outlet arranged to provide steam therethrough from the inner steam manifold into the plenum.

The diffuser according to any preceding clause, wherein the at least one outlet further includes at least one outer casing outlet through the outer casing or at least one inner casing outlet through the inner casing.

The diffuser according to any preceding clause, wherein the diffuser further includes at least one outer casing steam passage providing fluid communication between the outer steam manifold and the steam channel of the at least one diffuser strut, or at least one inner casing steam passage providing fluid communication between the inner steam manifold and the steam channel of the at least one diffuser strut.

The diffuser according to any preceding clause, wherein the at least one steam channel is included within the at least one diffuser strut, the at least one steam outlet provides a flow of steam therethrough to inject the steam into the plenum circumferentially between the respective pair of the plurality of swirler assemblies.

The diffuser according to any preceding clause, wherein the at least one steam channel further includes an outer steam manifold arranged at the diffuser outer casing, and an inner steam manifold arranged at the diffuser inner casing, and the at least one outlet includes at least one outer manifold outlet arranged to provide steam from the outer steam manifold into the plenum, and at least one inner manifold outlet arranged to provide steam from the inner steam manifold into the plenum.

The diffuser according to any preceding clause, wherein the at least one outer manifold outlet is arranged to inject steam in a strut injection zone defined circumferentially adjacent to the at least one diffuser strut and between the respective pair of the plurality of swirler assemblies, and the at least one inner manifold outlet is arranged to inject steam in the strut injection zone.

The diffuser according to any preceding clause, wherein the at least one outer manifold outlet is arranged to inject steam in a swirler injection zone defined circumferentially adjacent to a swirler assembly among the plurality of swirler assemblies, and the at least one inner manifold outlet is arranged to inject steam in the swirler injection zone.

The diffuser according to any preceding clause, wherein the at least one steam channel is included within the at least one diffuser strut, and the at least one outlet is arranged to inject steam from the at least one steam channel into the plenum.

The diffuser according to any preceding clause, wherein the at least one outlet is arranged through a side wall of the at least one diffuser strut.

The diffuser according to any preceding clause, wherein the at least one outlet is arranged through a trailing edge of the at least one diffuser strut.

The diffuser according to any preceding clause, wherein the at least one outlet includes a first outlet arranged to direct the steam therefrom toward an outer side of the plenum, and a second outlet arranged to direct the steam therefrom toward an inner side of the plenum.

The diffuser according to any preceding clause, wherein the first outlet is arranged adjacent to the diffuser outer casing, and the second outlet is arranged adjacent to the diffuser inner casing.

The diffuser according to any preceding clause, wherein the diffuser is a multi-passage diffuser and includes at least one splitter defining a plurality of flow passages, including a first flow passage and a second flow passage, the splitter defining an outer steam channel in the diffuser strut for injecting steam from the first flow passage and an inner steam channel in the diffuser strut for injecting steam from the second flow passage.

The diffuser according to any preceding clause, wherein the splitter includes at least one splitter steam manifold having at least one outlet that injects steam into the plenum.

The diffuser according to any preceding clause, wherein the splitter steam manifold extends circumferentially about the diffuser.

The diffuser according to any preceding clause, wherein the diffuser further includes a plurality of outlet guide vanes, at least one of the plurality of outlet guide vanes includes a steam channel therewithin and at least one outlet for providing a flow of steam from the steam channel into the diffuser flow passage.

The diffuser according to any preceding clause further including a steam source and at least one steam passage, the at least one steam passage providing a flow of steam from the steam source to the diffusor steam injection system.

The diffuser according to any preceding clause, wherein the at least one steam passage is arranged to provide the steam to the steam channel of the at least one diffuser strut.

The diffuser according to any preceding clause, wherein the at least one steam passage is arranged to provide the flow of steam to the steam channel of the at least one outlet guide vane.

The diffuser according to any preceding clause, wherein the diffuser includes (a) at least one diffuser strut that includes a steam channel and at least one outlet, and (b) at least one outlet guide vane that includes an outlet guide vane steam channel and at least one outlet guide vane outlet.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

18

We claim:
1. A gas turbine comprising:
a combustion section; and
a diffuser arranged to provide a flow of compressed air from a compressor to the combustion section, the diffuser including:
at least one outlet guide vane arranged on an upstream side of the diffuser;
a diffuser outer casing;
a diffuser inner casing;
at least one diffuser strut connecting the diffuser outer casing and the diffuser inner casing, the at least one diffuser strut located downstream of the at least one outlet guide vane; and
a steam injection system that provides a flow of a steam from the diffuser to the combustion section, the steam injection system including at least one steam channel having at least one outlet that provides a flow of the steam therethrough.

2. The gas turbine according to claim 1, wherein the at least one outlet guide vane includes the at least one steam channel that provides the flow of the steam therefrom into the diffuser.

3. The gas turbine according to claim 1, wherein the combustion section is an annular combustion section and includes an annular combustor outer casing, an annular combustor inner casing, and a combustor arranged between the annular combustor outer casing and the annular combustor inner casing, the annular combustor inner casing and the annular combustor outer casing defining a plenum surrounding the combustor, the steam injection system being arranged to inject the flow of the steam into the plenum.

4. The gas turbine according to claim 3, wherein the diffuser includes at least one steam injection nozzle assembly arranged on a downstream end of the diffuser, the at least one steam injection nozzle assembly having the at least one steam channel and the at least one outlet for injecting the flow of the steam in to the plenum.

5. The gas turbine according to claim 3, wherein the at least one steam channel includes an outer steam manifold arranged at the diffuser outer casing, and an inner steam manifold arranged at the diffuser inner casing.

6. The gas turbine according to claim 5, wherein the at least one outlet includes at least one outer manifold outlet arranged to provide steam therethrough from the outer steam manifold into the plenum, and at least one inner manifold outlet arranged to provide the flow of the steam therethrough from the inner steam manifold into the plenum.

7. The gas turbine according to claim 3, wherein the combustor comprises an annular outer liner, an annular inner liner, an annular dome connected between the annular outer liner and the annular inner liner, the annular outer liner, the annular inner liner, and the annular dome defining an annular combustion chamber therebetween, and a plurality of swirler assemblies connected to the annular dome and circumferentially spaced apart from one another, each diffuser strut among the at least one diffuser strut being spaced apart circumferentially from one another and being arranged circumferentially offset with respect to a circumferential location of the plurality of swirler assemblies so as to be arranged between a respective pair of the plurality of swirler assemblies.

8. The gas turbine according to claim 7, wherein the at least one steam channel is included within the at least one diffuser strut, the at least one outlet provides the flow of the steam therethrough to inject the steam into the plenum circumferentially between the respective pair of the plurality of swirler assemblies.

9. The gas turbine according to claim 8, wherein the at least one steam channel further includes an outer steam manifold arranged at the diffuser outer casing, and an inner steam manifold arranged at the diffuser inner casing, and the at least one outlet includes at least one outer manifold outlet arranged to provide the flow of the steam from the outer steam manifold into the plenum, and at least one inner manifold outlet arranged to provide the flow of the steam from the inner steam manifold into the plenum.

10. The gas turbine according to claim 9, wherein the at least one outer manifold outlet is arranged to inject the flow of the steam in a strut injection zone defined circumferentially adjacent to the at least one diffuser strut and between the respective pair of the plurality of swirler assemblies, and the at least one inner manifold outlet is arranged to inject the flow of the steam in the strut injection zone.

11. The gas turbine according to claim 9, wherein the at least one outer manifold outlet is arranged to inject the flow of the steam in a swirler injection zone defined circumferentially adjacent to a swirler assembly among the plurality of swirler assemblies, and the at least one inner manifold outlet is arranged to inject the flow of the steam in the swirler injection zone.

12. The gas turbine according to claim 3, wherein the at least one steam channel is included within the at least one diffuser strut, and the at least one outlet is arranged to inject the flow of the steam from the at least one steam channel into the plenum.

13. The gas turbine according to claim 12, wherein the at least one outlet is arranged through a side wall of the at least one diffuser strut.

14. The gas turbine according to claim 12, wherein the at least one outlet is arranged through a trailing edge of the at least one diffuser strut.

15. The gas turbine according to claim 14, wherein the at least one outlet includes a first outlet arranged to direct the flow of the steam therefrom toward an outer side of the plenum, and a second outlet arranged to direct the flow of the steam therefrom toward an inner side of the plenum.

16. The gas turbine according to claim 15, wherein the first outlet is arranged adjacent to the diffuser outer casing, and the second outlet is arranged adjacent to the diffuser inner casing.

17. A diffuser for a gas turbine, the diffuser comprising:
an outer casing extending circumferentially about a centerline axis;
an inner casing extending circumferentially about the centerline axis, a diffuser flow passage being defined between the outer casing and the inner casing;
a plurality of diffuser struts connected between the outer casing and the inner casing, at least one diffuser strut among the plurality of diffuser struts including a steam channel therewithin, and at least one steam outlet in fluid communication with the steam channel; and
a plurality of outlet guide vanes connected between the outer casing and the inner casing upstream of the at least one diffuser strut.

18. The diffuser according to claim 17, wherein the diffuser further comprises at least one of an outer steam manifold connected to the outer casing or an inner steam manifold connected to the inner casing, and
wherein at least one of the outer casing or the inner casing includes a steam passage providing fluid communication between the outer steam manifold and the steam channel of the at least one diffuser strut or between the inner steam manifold and the steam channel of the at least one diffuser strut.

19. The diffuser according to claim 17, at least one outlet guide vane among the plurality of outlet guide vanes includes an outlet guide vane steam channel therewithin and at least one outlet guide vane steam outlet for providing a flow of a steam from the outlet guide vane steam channel into the diffuser flow passage.

20. The diffuser according to claim 17, wherein the diffuser includes at least one steam injection nozzle assembly arranged on a downstream end of the diffuser, the at least one steam injection nozzle assembly having the steam channel and the at least one steam outlet.

* * * * *